United States Patent
Alcock et al.

(10) Patent No.: US 11,580,783 B2
(45) Date of Patent: Feb. 14, 2023

(54) UNUSUAL MOTION DETECTION METHOD AND SYSTEM

(71) Applicant: Avigilon Corporation, Vancouver (CA)

(72) Inventors: Nicholas Alcock, Vancouver (CA); Aleksey Lipchin, Newton, MA (US); Brenna Randlett, Vancouver (CA); Xiao Xiao, Reading, MA (US); Tulio de Souza Alcantara, Vancouver (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 87 days.

(21) Appl. No.: 17/103,393

(22) Filed: Nov. 24, 2020

(65) Prior Publication Data

US 2021/0110145 A1 Apr. 15, 2021

Related U.S. Application Data

(63) Continuation of application No. 15/943,256, filed on Apr. 2, 2018, now Pat. No. 10,878,227.

(60) Provisional application No. 62/590,498, filed on Nov. 24, 2017, provisional application No. 62/480,240, filed on Mar. 31, 2017.

(51) Int. Cl.
| | |
|---|---|
| *G06V 40/20* | (2022.01) |
| *G06K 9/62* | (2022.01) |
| *G06V 10/75* | (2022.01) |
| *G06V 20/52* | (2022.01) |
| *G06T 7/246* | (2017.01) |

(52) U.S. Cl.
CPC ........... *G06V 40/20* (2022.01); *G06K 9/6218* (2013.01); *G06K 9/6221* (2013.01); *G06T 7/246* (2017.01); *G06V 10/758* (2022.01); *G06V 20/52* (2022.01)

(58) Field of Classification Search
CPC ...... G06V 40/20; G06V 20/52; G06V 10/758; G06T 7/246; G06K 9/6218; G06K 9/6221
See application file for complete search history.

(56) References Cited

U.S. PATENT DOCUMENTS

| | | | |
|---|---|---|---|
| 6,628,323 B1 | 9/2003 | Wegmann | |
| 7,496,141 B2 | 2/2009 | Kwon et al. | |
| 8,284,258 B1 | 10/2012 | Cetin et al. | |
| 8,660,343 B2 * | 2/2014 | Chung | G06V 20/49 |
| | | | 382/164 |

(Continued)

FOREIGN PATENT DOCUMENTS

| | | | |
|---|---|---|---|
| WO | WO-2010111748 A1 | 10/2010 | |
| WO | WO-2017105347 A1 * | 6/2017 | ......... G06K 9/00718 |

OTHER PUBLICATIONS

International Search Report and Written Opinion dated Jul. 6, 2018, issued by the Canadian Intellectual Property Office in connection with PCT Application No. PCT/CA2018/050404, filed Apr. 3, 2018, 9 pages.

(Continued)

*Primary Examiner* — Mia M Thomas
(74) *Attorney, Agent, or Firm* — Perry + Currier, Inc.

(57) ABSTRACT

A method of detecting unusual motion is provided, including: determining features occurring during a fixed time period; grouping the features into first and second subsets of the fixed time period; grouping the features in each of the first and second subsets into at least one pattern interval; and determining when an unusual event has occurred using at least one of the pattern intervals.

15 Claims, 23 Drawing Sheets

(56) References Cited

U.S. PATENT DOCUMENTS

| | | | |
|---|---|---|---|
| 8,724,891 | B2 | 5/2014 | Kiryati et al. |
| 8,866,910 | B1 | 10/2014 | Cetin et al. |
| 9,082,203 | B2 | 7/2015 | Peterson et al. |
| 9,158,974 | B1 | 10/2015 | Laska et al. |
| 9,451,214 | B2* | 9/2016 | Ko .......... H04N 7/18 |
| 10,192,415 | B2 | 1/2019 | Heitz, III et al. |
| 10,339,386 | B2 | 7/2019 | Cetin et al. |
| 10,389,954 | B2 | 8/2019 | Shin et al. |
| 10,438,067 | B2 | 10/2019 | Miyazaki |
| 10,755,106 | B1* | 8/2020 | Bakry .......... G06V 20/46 |
| 10,878,227 | B2* | 12/2020 | Alcock .......... G06T 7/246 |
| 2003/0095602 | A1 | 5/2003 | Divakaran et al. |
| 2003/0185450 | A1 | 10/2003 | Garakani et al. |
| 2005/0207622 | A1* | 9/2005 | Haupt .......... H04N 7/181 |
| | | | 382/118 |
| 2006/0045185 | A1* | 3/2006 | Kiryati .......... G08B 13/1968 |
| | | | 375/E7.123 |
| 2006/0109341 | A1 | 5/2006 | Evans |
| 2010/0111363 | A1 | 5/2010 | Kelly et al. |
| 2010/0157049 | A1 | 6/2010 | Dvir et al. |
| 2012/0026308 | A1 | 2/2012 | Johnson et al. |
| 2012/0063641 | A1 | 3/2012 | Venkatesh et al. |
| 2012/0179421 | A1 | 7/2012 | Dasgupta |
| 2012/0314064 | A1* | 12/2012 | Liu .......... G06V 20/52 |
| | | | 348/143 |
| 2013/0242093 | A1 | 9/2013 | Cobb et al. |
| 2014/0003710 | A1* | 1/2014 | Seow .......... G06V 20/52 |
| | | | 382/159 |
| 2014/0003720 | A1* | 1/2014 | Seow .......... G06T 7/254 |
| | | | 382/173 |
| 2014/0218517 | A1 | 8/2014 | Kim et al. |
| 2015/0190085 | A1* | 7/2015 | Nathan .......... A61B 5/1123 |
| | | | 600/595 |
| 2015/0199892 | A1 | 7/2015 | Johnson et al. |
| 2015/0269050 | A1 | 9/2015 | Filimonov et al. |
| 2015/0279182 | A1 | 10/2015 | Kanaujia et al. |
| 2015/0325000 | A1 | 11/2015 | Sripada |
| 2016/0092738 | A1 | 3/2016 | Laska et al. |
| 2016/0125620 | A1 | 5/2016 | Heinrich et al. |
| 2016/0241818 | A1 | 8/2016 | Palanisamy et al. |
| 2016/0358436 | A1 | 12/2016 | Wautier et al. |
| 2016/0364129 | A1* | 12/2016 | McLean .......... G06F 3/04847 |
| 2016/0364966 | A1 | 12/2016 | Dixon et al. |
| 2017/0032194 | A1* | 2/2017 | Yu .......... G06V 20/53 |
| 2017/0048482 | A1 | 2/2017 | Drako et al. |
| 2017/0070707 | A1 | 3/2017 | Winter et al. |
| 2017/0155877 | A1 | 6/2017 | Johnson et al. |
| 2017/0161563 | A1 | 6/2017 | Cetin et al. |
| 2017/0178343 | A1* | 6/2017 | Maranatha .......... G06V 10/809 |
| 2017/0257612 | A1 | 9/2017 | Emeott et al. |
| 2018/0012460 | A1 | 1/2018 | Heitz, III et al. |
| 2018/0084225 | A1* | 3/2018 | Xu .......... H04N 7/18 |
| 2018/0096197 | A1 | 4/2018 | Kephart |
| 2018/0103206 | A1 | 4/2018 | Olson |
| 2018/0158323 | A1* | 6/2018 | Takenaka .......... G06V 20/46 |
| 2018/0204067 | A1 | 7/2018 | Kazui |
| 2018/0232592 | A1 | 8/2018 | Stewart et al. |
| 2018/0285633 | A1* | 10/2018 | Alcock .......... G06V 40/20 |
| 2019/0042856 | A1 | 2/2019 | Drako et al. |
| 2019/0114895 | A1* | 4/2019 | Tang .......... G08B 3/10 |
| 2019/0205608 | A1* | 7/2019 | Weitzman .......... G06N 3/08 |
| 2019/0221090 | A1* | 7/2019 | Beiser .......... G08B 13/19693 |
| 2019/0227096 | A1 | 7/2019 | Chowdhary et al. |
| 2020/0145620 | A1 | 5/2020 | Alcantara et al. |
| 2020/0327313 | A1* | 10/2020 | Kedarisetti .......... G06V 40/20 |
| 2021/0042548 | A1* | 2/2021 | Luo .......... G06Q 20/40145 |
| 2021/0241468 | A1* | 8/2021 | Zhang .......... H04N 7/188 |
| 2022/0277596 | A1* | 9/2022 | Li .......... G06T 7/64 |

OTHER PUBLICATIONS

Vikas Reddy, et al., "Improved Anomaly Detection in Crowded Scenes via Cell-Based Analysis of Foreground Speed, Size and Texture", CVPRW, pp. 55-61, 2011, obtained via the Internet: <https://arxiv.org/pdf/1304.0886.pdf>, 7 pages.

Kai-Wen Cheng, et al., "Video Anomaly Detection and Localization Using Hierarchical Feature Representation and Gaussian Process Regression", CVPR, 2015, 9 pages.

Mehrsan J. Roshtkhari, et al., "An On-line, Real-Time Learning Method for Detecting Anomalies in Videos Using Spatio-Temporal Compositions", Computer Vision and Image Understanding, 2013, 17 pages.

Enamul Hoque, et al., "Holmes: A Comprehensive Anomaly Detection System for Daily In-Home Activities", Distributed Computing in Sensor Systems, 2015, 12 pages.

Jing Wang, et al., "Statistical Traffic Anomaly Detection in Time-Varying Communication Networks", IEEE Transactions on Control of Network Systems, 2015, 13 pages.

Google Books, Lavagetto F. and Traverso P., "Causal Estimation of the Displacement Field for Implicit Motion Compensation" in "Time-Varying Image Processing and Moving Object Recognition", V. Cappellini (ed.), pp. 175-182, 1994, <https://www.google.com/books/edition/_/K2khBQAAQBAJ?hl=en>, 3 pages.

* cited by examiner

|  | Su | Mo | Tu | We | Th | Fr | Sa |
|---|---|---|---|---|---|---|---|
| 00:01 | D1H1 | D2H1 | D2H1 | D2H1 | D2H1 | D2H1 | D1H1 |
| 01:02 | D1H1 | D2H1 | D2H1 | D2H1 | D2H1 | D2H1 | D1H1 |
| 02:03 | D1H2 | D2H1 | D2H1 | D2H1 | D2H1 | D2H1 | D1H2 |
|  | D1H2 | D2H2 | D2H2 | D2H2 | D2H2 | D2H2 | D1H2 |
| ... | ... | ... | ... | ... | ... | ... | ... |
|  | D1H2 | D2H2 | D2H2 | D2H2 | D2H2 | D2H2 | D1H2 |
|  | D1H2 | D2H2 | D2H2 | D2H2 | D2H2 | D2H2 | D1H2 |
| 21:22 | D1H2 | D2H1 | D2H1 | D2H1 | D2H1 | D2H1 | D1H2 |
| 22:23 | D1H1 | D2H1 | D2H1 | D2H1 | D2H1 | D2H1 | D1H1 |
| 23:24 | D1H1 | D2H1 | D2H1 | D2H1 | D2H1 | D2H1 | D1H1 |

D1, D2 are Day Level Clusters
H1, H2 are Hour Level Clusters
4 Clusters D1H1, D1H2, D2H1, D2H2

FIG. 21

Possible Combinations of Day and Hour Level Clusters

4 Clusters:    D1H1, D1H2, D2H1, D2H2

3 Clusters:    D1H ——, D2H1, D2H2
                  D1H1, D1H2, D2H ——

2 Clusters:    D1H ——, D2H ——

1 Cluster:    —— DH ——

FIG. 22

UNUSUAL MOTION DETECTION METHOD AND SYSTEM

RELATED APPLICATIONS

This application is a continuation of U.S. patent application Ser. No. 15/943,256 filed Apr. 2, 2018 (now issued as U.S. Pat. No. 10,878,227), which claims the benefit of U.S. Provisional Patent Application No. 62/480,240 filed on Mar. 31, 2017 and U.S. Provisional Patent Application No. 62/590,498 filed on Nov. 24, 2017, the entireties of all of which are hereby incorporated by reference.

FIELD

The present subject-matter relates to unusual motion detection in video, and more particularly to unusual motion detection in the playback of recorded video and in the display of video from video cameras in near real time.

BACKGROUND

Playback of recorded video is one of the core operations of a video surveillance system. The playback of recorded video may be useful to review and identify events found in the video captured by the video cameras. There may be a large amount of recorded video in any search for events of interest. It would assist reviewers of such recorded video to be able to quickly determine unusual events.

In the video camera surveillance system, there may be a large number of cameras that are each generating its own video feed, which can make the simultaneous viewing of these video feeds by security personnel cumbersome. It would assist such security personnel if alerts or indications are generated in real-time, when events of interest, such as unusual motions, are detected.

SUMMARY

The embodiments described herein provide in one aspect a method of detecting unusual motion in video as substantially described herein.

According to a first aspect, there is provided a method comprising: A method, comprising: dividing a fixed time period into a plurality of time intervals; receiving statistical information associated with motion vectors associated with activity occurring in each of the plurality of time intervals; clustering the time intervals into at least first and second clusters within the fixed time period based on similarity of statistical information within each time interval; and determining when an unusual event occurring at a time has occurred using the statistical information associated with a corresponding time interval within the plurality of time intervals. The fixed time period may be a week. Each of the plurality of time intervals may represent an hour.

According to another aspect, there is provided a method comprising: receiving a plurality of motion vectors representing an activity in a video stream; determining a plurality of statistical intervals, each based on the plurality of motion vectors; clustering the plurality of statistical intervals into one or more pattern intervals based on the similarity of the grouped statistical intervals, each of the pattern intervals representing at least one time interval within a time period; and using the pattern intervals to determine when an unusual motion event has occurred. The statistical intervals may be used to create a plurality of histograms and may be clustered into pattern intervals based on a distance matrix calculated between each histogram. The clustering may be re-executed periodically According to another aspect, there is provided a method comprising: detecting a moving object in a video stream, the video stream comprising a plurality of cells; determining, for each cell of the plurality of cells, if motion of the moving object is unusual; and if the motion of the moving object is unusual for at least one cell of the plurality of cells, displaying an unusual motion block on the at least one cell. The block may be colored to indicate rarity of the unusual motion. The block may be colored to indicate a type of unusual motion. A timeline may be displayed of at least a portion of the video stream, wherein unusual motion events are displayed on the timeline. The unusual motion events displayed on the timeline may be filterable by at least one of: type of unusual motion; direction of unusual motion; amount of unusual motion; speed of unusual motion; absence of motion; classification of moving objects; size of moving objects; and position of the at least one cell within a field of view. The unusual motion events may be selectable for display using the timeline.

According to another aspect, there is provided a method comprising: receiving a plurality of motion vectors representing an activity in a video stream, the motion vectors associated with time intervals, the time intervals including a day of the week and an hour within each of the days; clustering the plurality of statistical intervals into one or more day long pattern intervals based on similarities of noisiness of the motion vectors associated with each day of the week; for each of the one or more day long pattern intervals dividing the day long pattern intervals into one or more hourly intervals based on similarities of noisiness of the motion vectors within each hour of the one or more day long pattern intervals; and using the pattern intervals to determine when an unusual motion event has occurred.

According to another aspect, there is provided a system comprising: a display; an input device; a processor communicatively coupled to the display and the input device; and a memory communicatively coupled to the processor and having stored thereon computer program code that is executable by the processor, wherein the computer program code, when executed by the processor, causes the processor to perform the methods described above.

According to another aspect, there is provided a non-transitory computer readable medium having stored thereon computer program code that is executable by a processor and that, when executed by the processor, causes the processor to perform the methods described above.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

The detailed description refers to the following figures, in which:

FIG. 21 illustrates a weekly calendar showing clusters according to an example embodiment; and FIG. 22 illustrates the possible combinations of day and hour level clusters according to an example embodiment.

Figure 1:
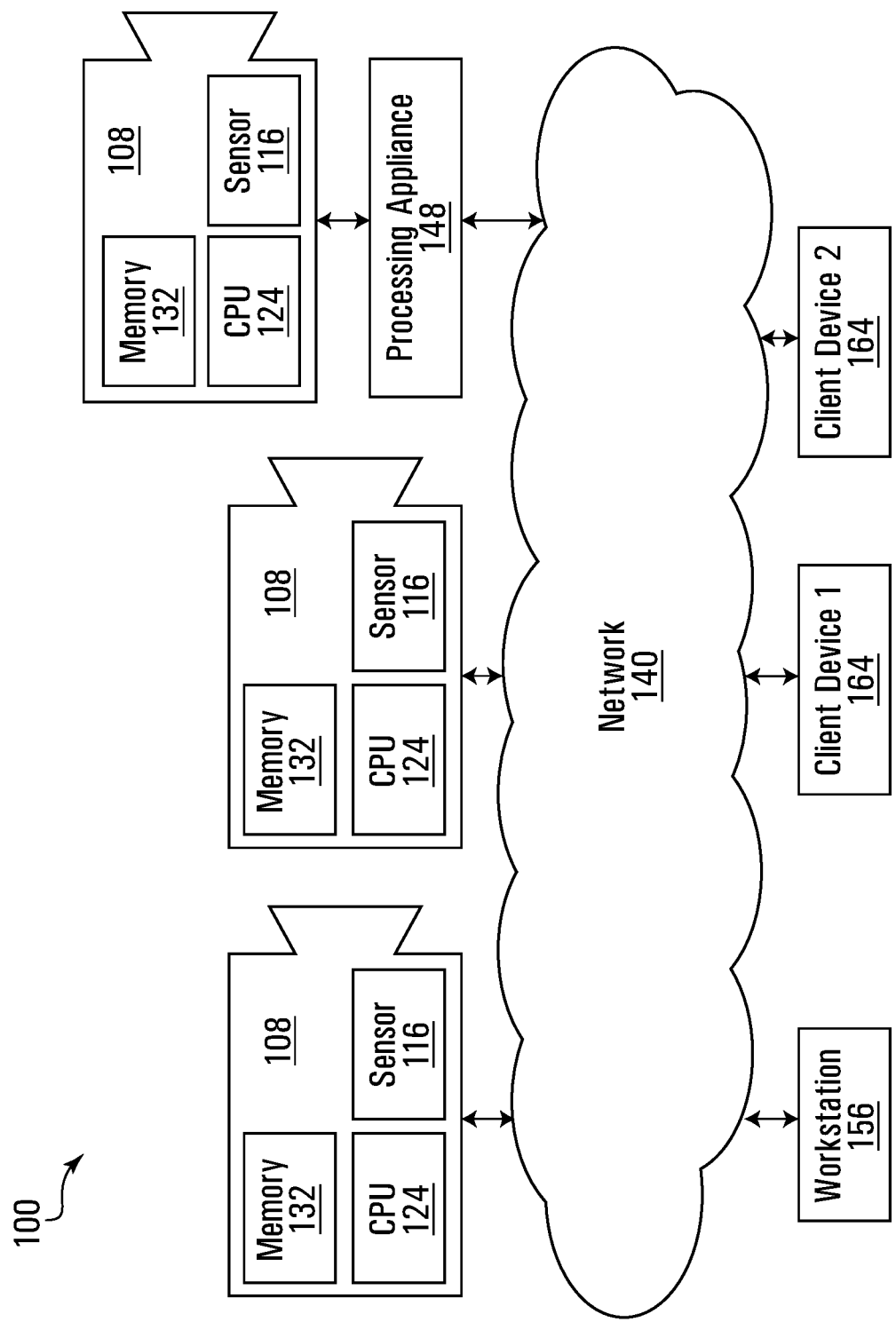
FIG. 1 illustrates a block diagram of connected devices of a video surveillance system according to an example embodiment.

It will be appreciated that for simplicity and clarity of illustrates, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

"Processing image data" or variants thereof herein refers to one or more computer-implemented functions performed on image data. For example, processing image data may include, but is not limited to, image processing operations, analyzing, managing, compressing, encoding, storing, transmitting and/or playing back the video data. Analyzing the image data may include segmenting areas of image frames and detecting objects, tracking and/or classifying objects located within the captured scene represented by the image data. The processing of the image data may cause modified image data to be produced, such as compressed (e.g. lowered quality) and/or re-encoded image data. The processing of the image data may also cause additional information regarding the image data or objects captured within the images to be outputted. For example, such additional information is commonly understood as metadata. The metadata may also be used for further processing of the image data, such as drawing bounding boxes around detected objects in the image frames.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video surveillance system 100 according to an example embodiment. The video surveillance system 100 includes hardware and software that perform the processes and functions described herein.

The video surveillance system 100 includes at least one video capture device 108 being operable to capture a plurality of images and produce image data representing the plurality of captured images.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal features is to capture images or video. In some example embodiments, the dedicated camera may perform functions associated to the captured images or video, such as but not limited to processing the image data produced by it or by another video capture device 108. For example, the dedicated camera may be a surveillance camera, such as any one of a box, pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors and one or more network interfaces. The memory device can include a local memory (e.g. a random access memory and a cache memory) employed during execution of program instructions. The processor executes computer program instruction (e.g., an operating system and/or application programs), which can be stored in the memory device.

In various embodiments the processor 124 may be implemented by any processing circuit having one or more circuit units, including a digital signal processor (DSP), graphics processing unit (GPU) embedded processor, etc., and any combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the video capture device 108 may be implemented together within a system on a chip (SOC). For example, the processor 124, the memory device 116 and the network interface may be implemented within a SOC. Furthermore, when implemented in this way, both a general purpose processor and DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any communications network that provides reception and transmission of data. For example, the network 140 may be a local area network, external network (e.g. WAN, Internet) or a combination thereof. In other examples, the network 140 may include a cloud network.

In some examples, the video surveillance system 100 includes a processing appliance 148. The processing appliance 148 is operable to process the image data outputted by a video capture device 108. The processing appliance 148 also includes one or more processor and one or more memory devices coupled to the processor. The processing appliance 148 may also include one or more network interfaces.

For example, and as illustrated, the processing appliance 148 is connected to a video capture device 108. The processing appliance 148 may be further connected to the network 140.

According to one exemplary embodiment, and as illustrated in FIG. 1, the video surveillance system 100 includes at least one workstation 156 (e.g. server), each having one or more processors. The at least one workstation 156 may also include storage memory. The workstation 156 receives image data from at least one video capture device 108 and performs processing of the image data. The workstation 156 may further send commands for managing and/or controlling one or more of the video capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video surveillance system 100 further includes at least one client device 164 connected to the network 140. The client device 164 is used by one or more users to interact with the video surveillance system 100. Accordingly, the client device 164 includes at least one display device and at least one user input device (e.g. mouse, keyboard, touchscreen). The client device 164 is operable to display on its display device a user interface for displaying information, receiving user input, and playing back recorded video including near real time video received from the video capture devices 108. Near real time video means the display depicts video of an event or situation as it existed at the current time minus the processing time, as nearly the time of the live event in the field of view of the video capture devices 108. For example, the client device may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation and one or more client devices 164.

In some examples, the video surveillance system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
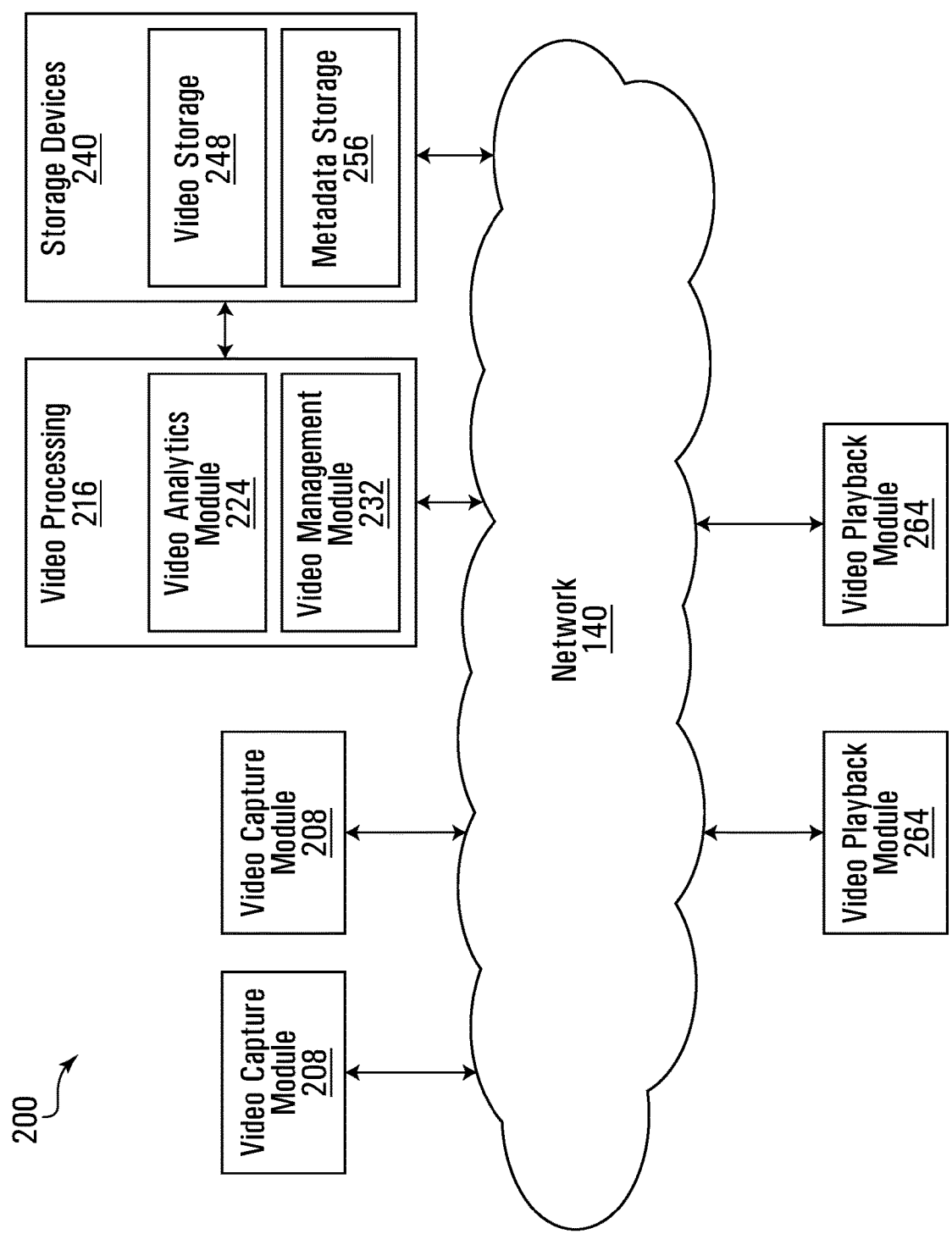
FIG. 2A illustrates a block diagram of a set of operational modules of the video surveillance system according to one example embodiment.

Referring now to FIG. 2A, therein illustrated is a block diagram of a set 200 of operational modules of the video surveillance system 100 according to one example embodiment. The operational modules may be implemented in hardware, software or both on one or more of the devices of the video surveillance system 100 as illustrated in FIG. 1A.

The set 200 of operational modules include at least one video capture module 208. For example, each video capture device 108 may implement a video capture module 208. The video capture module 208 is operable to control one or more components (e.g. sensor 116, etc.) of a video capture device 108 to capture image data, for example, video.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 further outputs metadata providing information about the determinations including activity or motion detection as will be detailed in FIG. 3 and later figures. Other examples of determinations made by the video analytics module 224 may include one or more of foreground/background segmentation, object detection, object tracking, motion detection, object classification, virtual tripwire, anomaly detection, facial detection, facial recognition, license plate recognition, identifying objects "left behind", monitoring objects (i.e. to protect from stealing), and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management 232 may also process the image data according to storage capacity within the video surveillance system 100 for storing image data.

It will be understood that according to some example embodiments, the subset 216 of video processing modules may include only one of the video analytics module 224 and the video management module 232.

The set 200 of operational modules further includes a subset 240 of storage modules. For example, and as illustrated, the subset 240 of storage modules include a video storage module 248 and a metadata storage module 256. The video storage module 248 stores image data, which may be image data processed by the video management module 232. The metadata storage module 256 stores information data outputted from the video analytics module 224.

It will be understood that while video storage module 248 and metadata storage module 256 are illustrated as separate modules, they may be implemented within a same hardware storage device whereby logical rules are implemented to separate stored video from stored metadata. In other example embodiments, the video storage module 248 and/or the metadata storage module 256 may be implemented within a plurality of hardware storage devices in which a distributed storage scheme may be implemented.

The set of operational modules further includes at least one video playback module 264, which is operable to receive image data from each capture device 108 and playback the image data as a video on a display. For example, the video playback module 264 may be implemented on a client device 164 to play recorded video (from storage devices 240) and to play near real time video from the video capture devices 108.

The operational modules of the set 200 may be implemented on one or more of the video capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of a video capture device 108, processing appliance 148 and workstation 156. Similarly, video management functionalities may be split between one or more of a video capture device 108, processing appliance 148 and workstation 156.

Figure 2B:
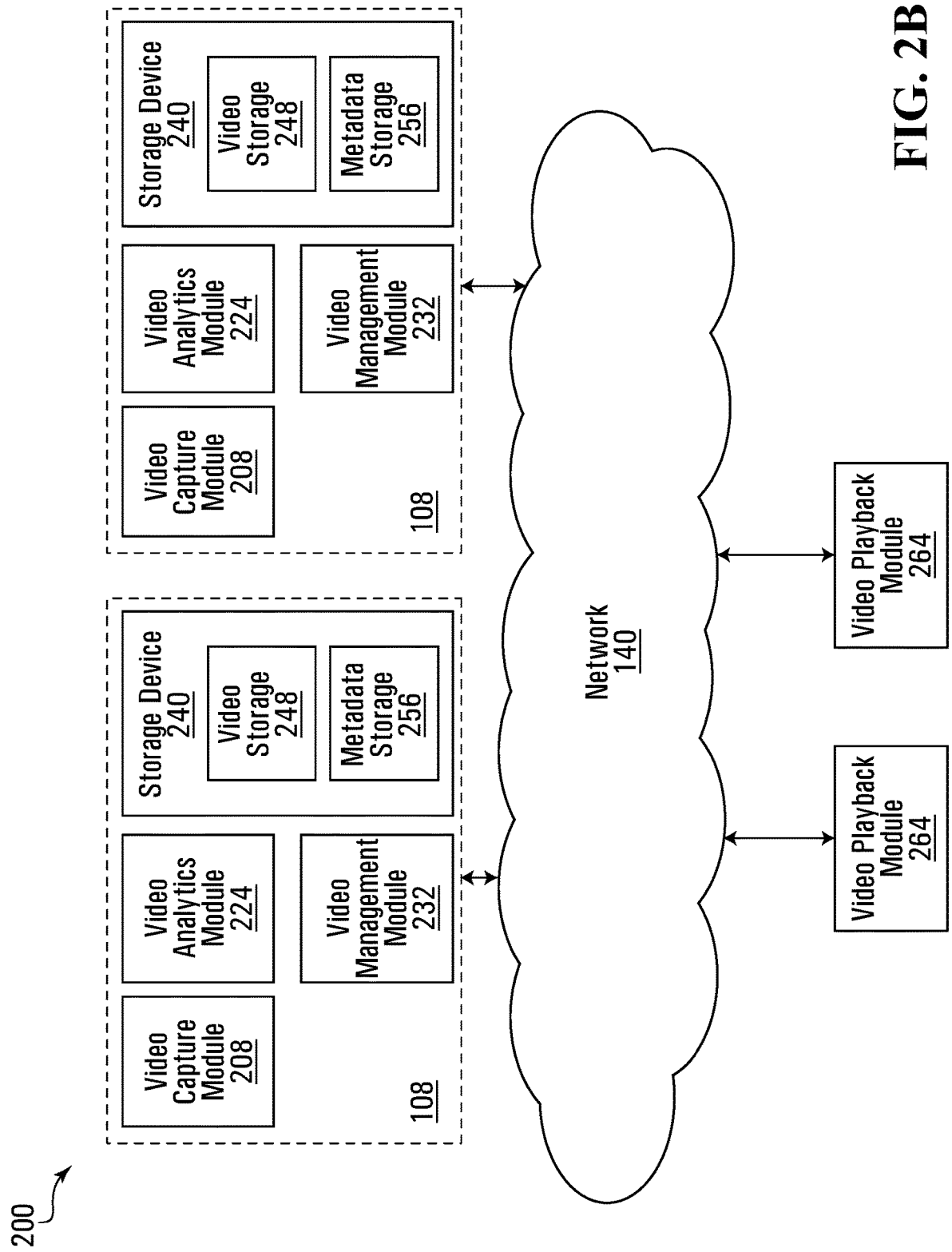
FIG. 2B illustrates a block diagram of a set of operational modules implemented within one device according to one example embodiment.

Referring now to FIG. 2B, therein illustrated is a block diagram of a set 200 of operational modules of the video surveillance system 100 according to one particular example embodiment wherein the video capture module 208, the video analytics module 224, the video management module 232 and the storage device 240 is wholly implemented on the one or more video capture devices 108. Accordingly, the video surveillance system 100 may not require a workstation 156 and/or a processing appliance 148.

As described elsewhere herein image data is produced by each of the video capture devices 108. According to various examples, the image data produced is video data (i.e. a plurality of sequential image frames). The video data produced by each video capture device is stored as a video feed within the system 100. A video feed includes segments of video data that have been recorded intermittently. Intermittently recorded video refers to the carrying out of recording of video data produced by a video capture device 108 over an interval of time wherein some of the video data produced by the video capture device 108 is not recorded. Video data produced while recording is being carried out is stored within the system 100 (e.g. within video storage module 248). Video data produced while recording is not being carried out is not stored within the system 100.

For example, whether video data produced by a video capture device 108 is recorded is determined based a set of one or more rules. For example, video data may be recorded based on presence of a feature in the scene captured within the video, such as motion being detected. Alternatively, or additionally, video data may be recorded based on a predetermined recording schedule. Video data may also be selectively recorded based on a command from an operator.

For example, over the interval of time, a first sub-interval of time during which recording for a video capture device is being carried out results in a first segment of video data to be stored. This stored segment of video data includes the plurality of sequential images produced by the video capture device 108 during the first sub-interval of time.

Over a second sub-interval of time during which recording is not being carried out, the produced plurality of images are not stored. Accordingly this image data is lost.

Over a third sub-interval of time during which recording for the video capture device is being carried out again results in another segment of video data to be stored. This stored segment of video data includes the plurality of sequential images produced by the video capture device 108 during the third sub-interval of time.

Accordingly, the video feed for a given video capture device 108 is formed of the one or more segments of video data that are stored as a result of the intermittent recording of video data produced by the given video capture device 108.

The video feed for the given video capture device 108 may be associated with a metadata entry. The metadata entry includes one or more indicators that indicate temporal positions of the beginning and end of each video data segment of the video feed. The temporal position indicates the time at which a beginning or end of video data segment occurred. For example, the temporal position may indicate the real-world time at which the beginning or end of a video data segment occurred.

According to some example embodiments, the metadata entry may further include a plurality of indicators that indicate the temporal positions of the beginning and end of one or more events detected within the stored video data segment of a video feed.

Figure 3:
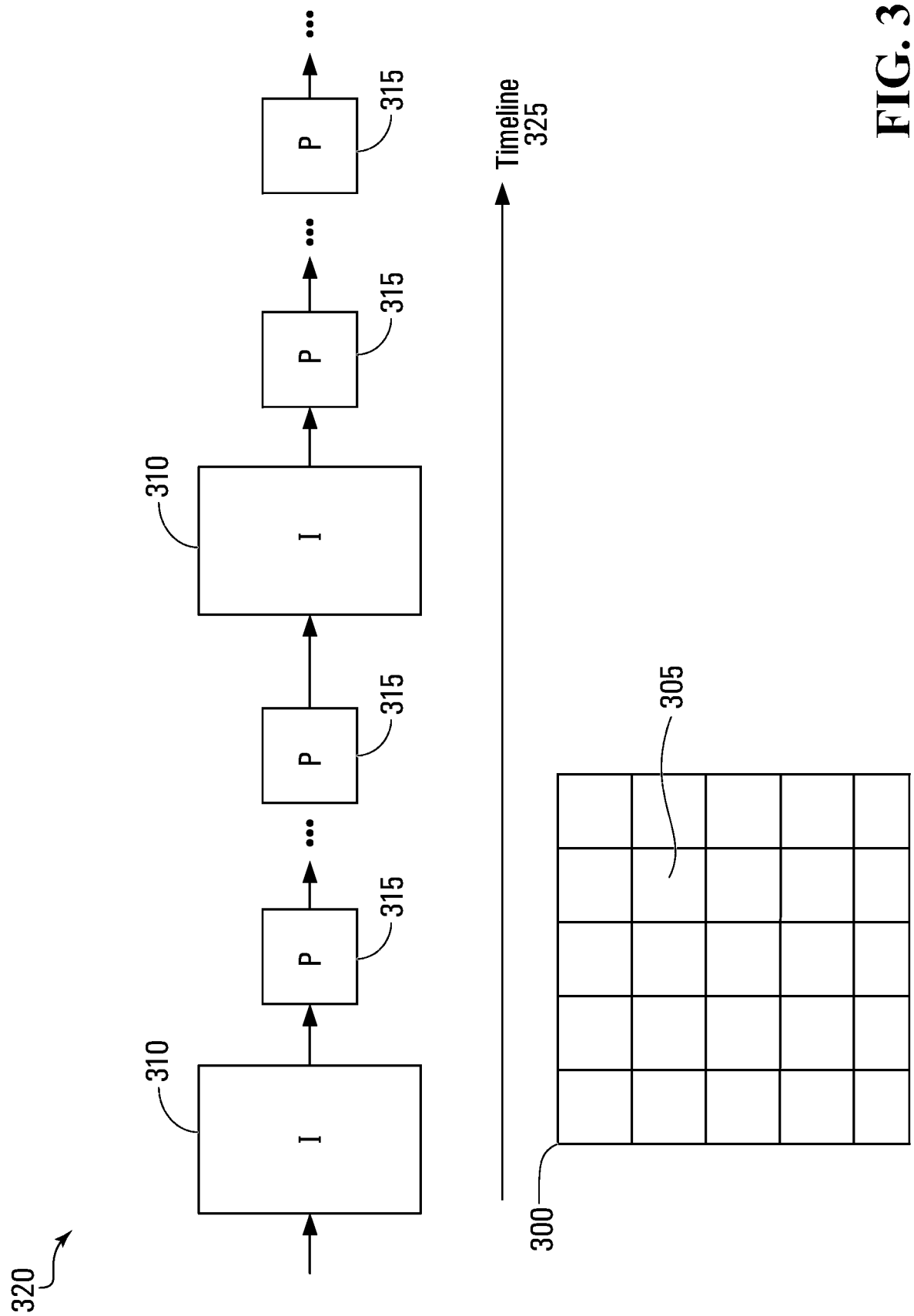
FIG. 3 illustrates a block diagram of video data generated by a video surveillance system according to one example embodiment.

Referring now to FIG. 3, therein illustrated is a block diagram of an embodiment of video data generated by the video surveillance system 100 in accordance with H.block. H.264 or MPEG-4 Part 10 is a block-oriented motion-compensation-based video compression standard of the International Telecommunication Union. It is one of the most commonly used formats for the recording, compression, and distribution of video content.

The H.264 standard is complex, but at a high level, this compression takes a scene 300 in the field of view of a video capture device 108 and divides the scene 300 into macroblocks 305. A motion vector is associated with each of the macroblocks 305. A video stream 320 generated by H.264, for example, of 30 fps (30 frames per second) over timeline 325 where each frame comprises an I-frame 310 followed by P-frames 315. Each I-frame 310 is a full image of the scene 300 and each P-frame 315 comprises the motion vectors of each of the macroblocks 305 of the scene 300 since the time interval from the previous adjacent P-frame 315 or I-frame 310 as the case may be. The P-frame 315 is also called the inter-picture prediction frame as they include an estimate of the motion predicting where the content of the macroblocks 305 have moved in the scene 300. The P-frame 300 also contains compressed texture information. The I-frame is also called the index frame. The blocks 305 may have variable sizes such as 16×16 pixels or 8×16 pixels. The details of the H.264 standards are in the publications of the International Telecommunication Union and the high level details provided herein are only to facilitate the understanding of the embodiments disclosed herein.

The motion vectors of the P-frames have a magnitude and a direction for the motion. The magnitude and direction are not directly in the P frame, these two values are calculated from the shifted pixel on x and the shifted pixel on y, i.e. magnitude=square root $(x^2+y^2)$ and direction=a tan(y/x)).

Statistical models of these example activities or motions (direction, magnitude, presence, and absence) are created (learned) over time from the motion vectors. For a given example activity, a probability can be provided from the statistical model to indicate how common or uncommon is a given activity. At least one statistical model is calculated or generated for each block 305 over a time period, also referred to herein as an "interval". An uncommon or unusual motion (anomaly) may then be detected and highlighted to alert security personnel. In addition, the absence of motion may be considered unusual in cases where there is usually constant motion previously. Conversely, the presence of motion may be unusual motion when there has been little or no motion previously.

The statistical models are constantly learning, and may be changing, with new motion vectors received for each new frame over an interval. In an alternative embodiment, the statistical models may be fixed once built or learned and only updated periodically with new motion vectors.

Although this embodiment has been implemented using H.264, it will be understood by those of ordinary skill in the art that the embodiments described herein may be practiced using other standards such as H.265.

An approach in detecting anomalies is to learn a statistical model based on features. Features are information such as motion vectors, optical flow, detected object trajectories, and texture information. The activities, such as motion, which are dissimilar to normal patterns or that have a low probability of occurrence are reported as anomalies, i.e. unusual motion.

There may be several distinctive patterns of activity during a one day period, such as morning rush hours, lunch time, and afternoon rush hours. Furthermore, the time intervals of these patterns within the day may change over time, for example with different seasons.

Figure 4:
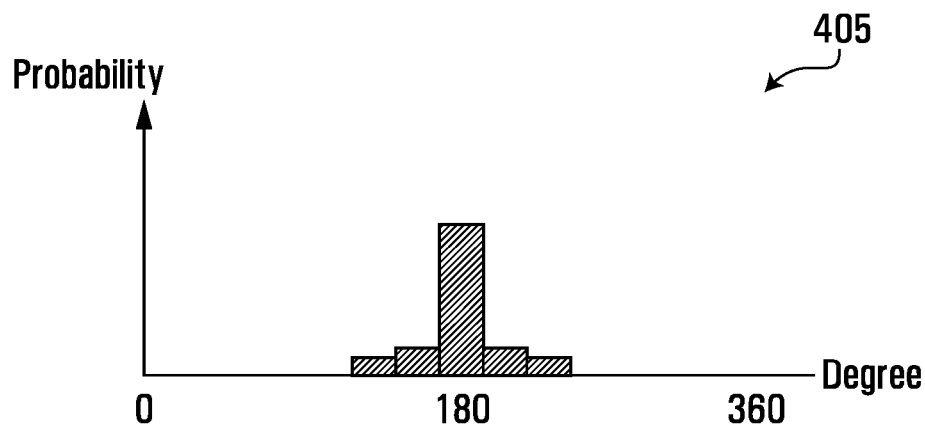
FIG. 4 illustrates graphs using motion vectors with only one dimension according to one example embodiment.
Figure 4:
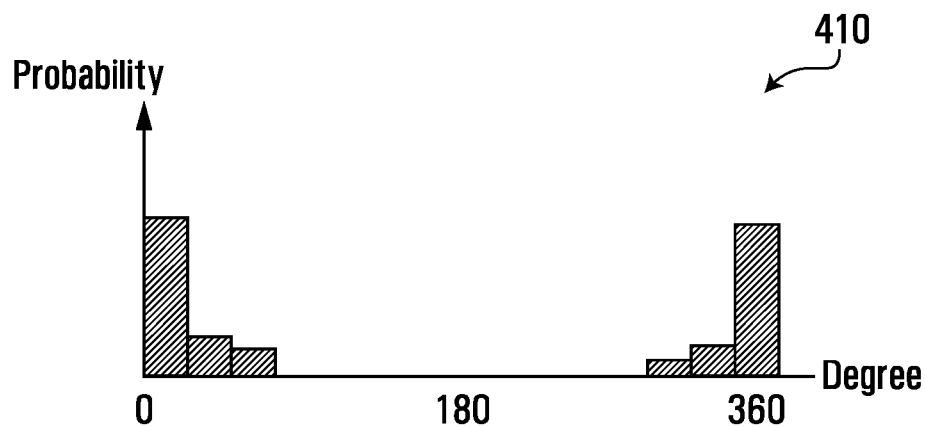
Figure 4:
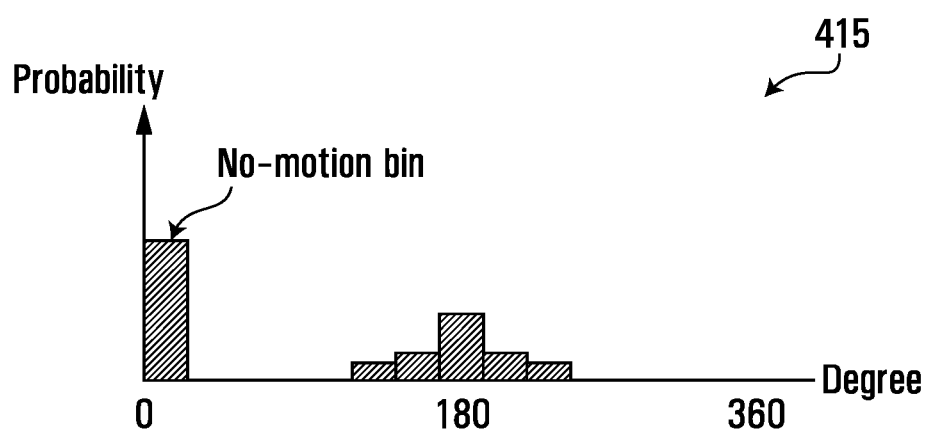

Referring now to FIG. 4, therein illustrated are three graphs using motion vectors with a single dimension, motion direction, according to one particular example embodiment. FIG. 4 shows two example graphs 405, 410 of probability distribution (histograms) for motion direction. In the graphs 405, 410, the x axis represents the degree of the direction of motion (the unit of direction) ranging from 0 to 360 degrees; the y axis represents the probability (frequency), equivalent to the number of times (counts) a specific degree (feature value) of motion occurs. Graph 405 shows that most motion is in directions corresponding to about 180 degrees. Graph 410 shows most motion is in directions around 0 (or 360) degrees, which is in the opposite direction to that shown in graph 410. These two statistical distributions are quite different, therefore, they may represent different activities, for example, graph 410 may represent cars driving to the East (0 degree) in the morning of a day in a field of view and graph 405 may represent cars driving to the west (180 degrees) in the afternoon of that day in the field of view.

FIG. 4 is a simplified example of a real world condition of a highway following a one-way direction schedule: all the cars drive from east to west during the morning (8 am-12 pm); and on the same road, all the cars must drive from west to east during the afternoon (12 pm-5 pm). If the day in the learning period is "the day" then the statistical model may not be accurate for either the morning or afternoon situation. During the morning, if a car travels from west to east, it would be an anomaly (abnormal motion direction) since normal pattern is that cars drive from east to west. However, during the afternoon, if a car travels from west to east, it would not be an anomaly since it matches the normal pattern (driving from west to east). Thus the same motion (driving from west to east) could be an anomaly during the morning but not anomaly during the afternoon. If these two activity patterns are not distinguished during the day, anomalies cannot be detected correctly.

Further, even if all the activity patterns are known at a specific time, they may change in the future as time passes. For example, morning traffic in summer may be less intensive than the winter. The statistical models should evolve over time as the conditions of the field of views change.

For the embodiment shown in FIG. 4, an example statistical model for direction is a histogram of motion vector directions. The histogram shown has twelve bins on the horizontal line and each bin corresponds to a 30 degree interval. The height of each bin represents the probability (frequency) of observed motion vectors having direction within a corresponding 30 degree bin interval. The probability (frequency) is calculated as the normalized number of observations (counts); the number of observations for a given bin divided by the total number of observations for all the bins.

With the normalized number of observations, a new bin is added to the histogram (as shown in graph 415) to take into account the case of zero motion vectors (i.e. the absence of motion). This bin is referred to as a No-Motion bin. This bin does not correspond to any specific degree interval but corresponds to observing no motion vector, i.e. zero motion vector. If no motion is observed for a given frame, the No-Motion bin value is incremented and then the histogram is renormalized. In such a case the value of all bins corresponding to motion direction decreases and the value of No-Motion bin increases. If the (non-zero) motion vector is observed the value of the bin corresponding to the direction of this motion vector is incremented and then the histogram renormalized. In this case the value of the bin corresponding to this direction increases while the value of all other bins, including the No-Motion bin, decrease.

Figure 5A:
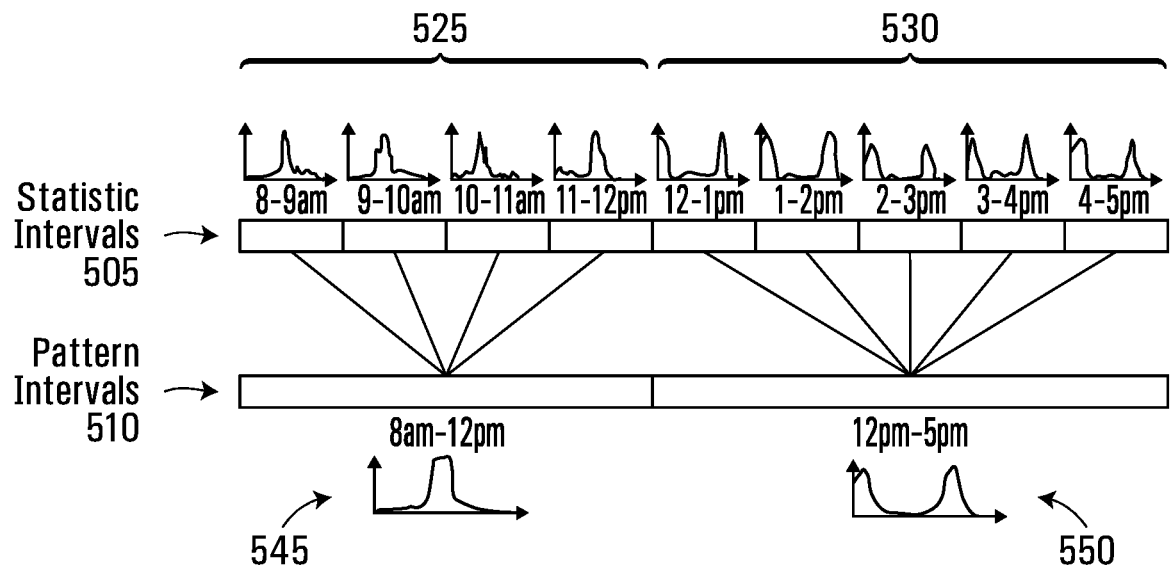
FIGS. 5A and 5B illustrate intervals and their statistics according to one example embodiment.
Figure 5B:
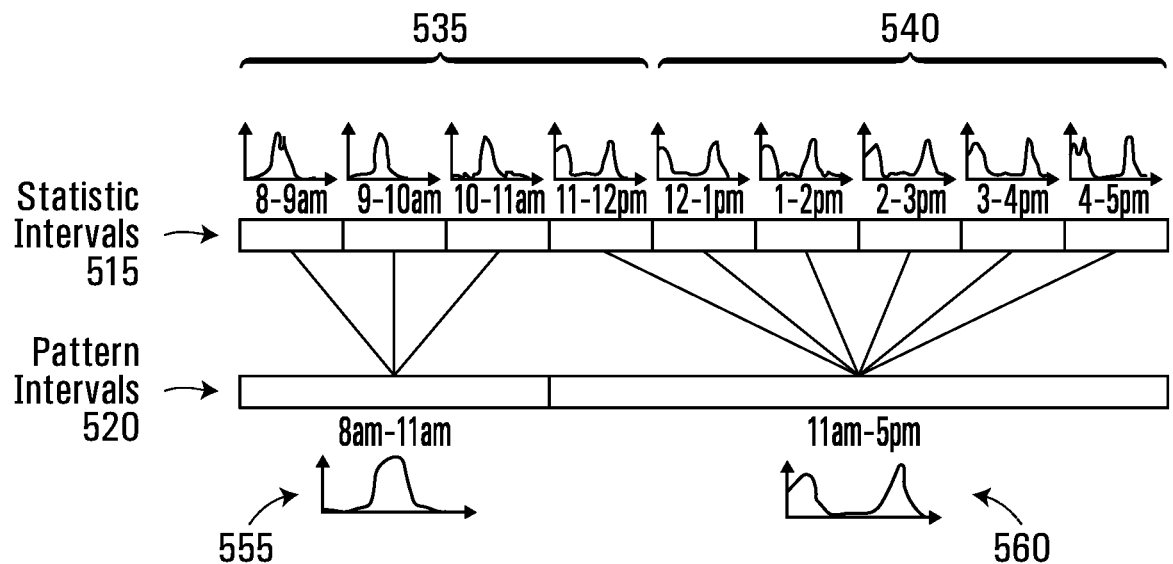

Referring now to FIGS. 5A and 5B, therein illustrated is a diagram of intervals and their statistics (presented as histograms) according to one particular example embodiment. There is shown an example of a set of statistical intervals 505, 515 and rows of pattern intervals 510, 520. FIG. 5A, using hour-based statistical intervals 505 during the daytime (8 am-5 pm), provides nine statistical intervals 505. As shown, the statistical intervals 505 are clustered into two pattern intervals (8 am-12 pm and 12 pm-5 pm) in row 510. The first pattern interval includes four statistical intervals (8-9 am, 9-10 am, 10-11 am, and 11 am-12 pm) representing the morning, which have similar statistics 545 and graphs 525. The second pattern interval includes five statistical intervals (12-1 pm, 1-2 pm, 2-3 pm, 3-4 pm, 4-5 pm) representing the afternoon, which have similar statistics 550 and graphs 530. The graphs 525, 530, 535, 540 are the statistics (histograms) learned for each interval. As shown, there are two very different sets of statistics 545, 550 in pattern interval 510.

As compared to FIG. 5A, FIG. 5B shows the case in which the pattern intervals 510 change to pattern intervals 520. After the change, the first pattern interval in 515 now includes three statistical intervals (8-9 am, 9-10 am, 10-11 am) which have similar statistics 555 and graphs 535. The second pattern interval in 515 has six statistical intervals (11 am-12 pm, 12-1 pm, 1-2 pm, 2-3 pm, 3-4 pm, and 4-5 pm) which have similar statistics 560 and graphs 540. The graphs 535, 540 are the statistics (histograms) learned for each pattern interval.

When the pattern intervals in rows 510, 520 change, the statistical intervals 505, 515 within the pattern intervals in rows 510, 520 also change. In this case, instead of four, there are three statistics intervals 515 to calculate the probabilities in the first pattern interval (8 am-11 am) in row 520. The graphs 525, graphs 535, and graph 555 have similar statistics. The graphs 530, graphs 540, and graph 560 have similar statistics, but are different from those of the graphs 525, graphs 535, and graph 555. By using the statistical intervals 505, 515, there may not be a need to begin over again when pattern intervals in rows 510, 520 change. In other words, the statistical intervals can be regrouped to form different pattern intervals to reflect changing activity or motion patterns. This regrouping of existing statistical intervals does not require relearning activity statistics (statistical models) from scratch.

Each statistical interval has statistics (a histogram) and each of the statistical intervals are combined within one or more pattern intervals to calculate the probabilities of whether or not an event or activity or motion is detected as an anomaly (unusual motion detection), i.e. these probabilities are used for identifying anomalies. A pattern interval is used as a time range within which the activities are similar.

Figure 6:
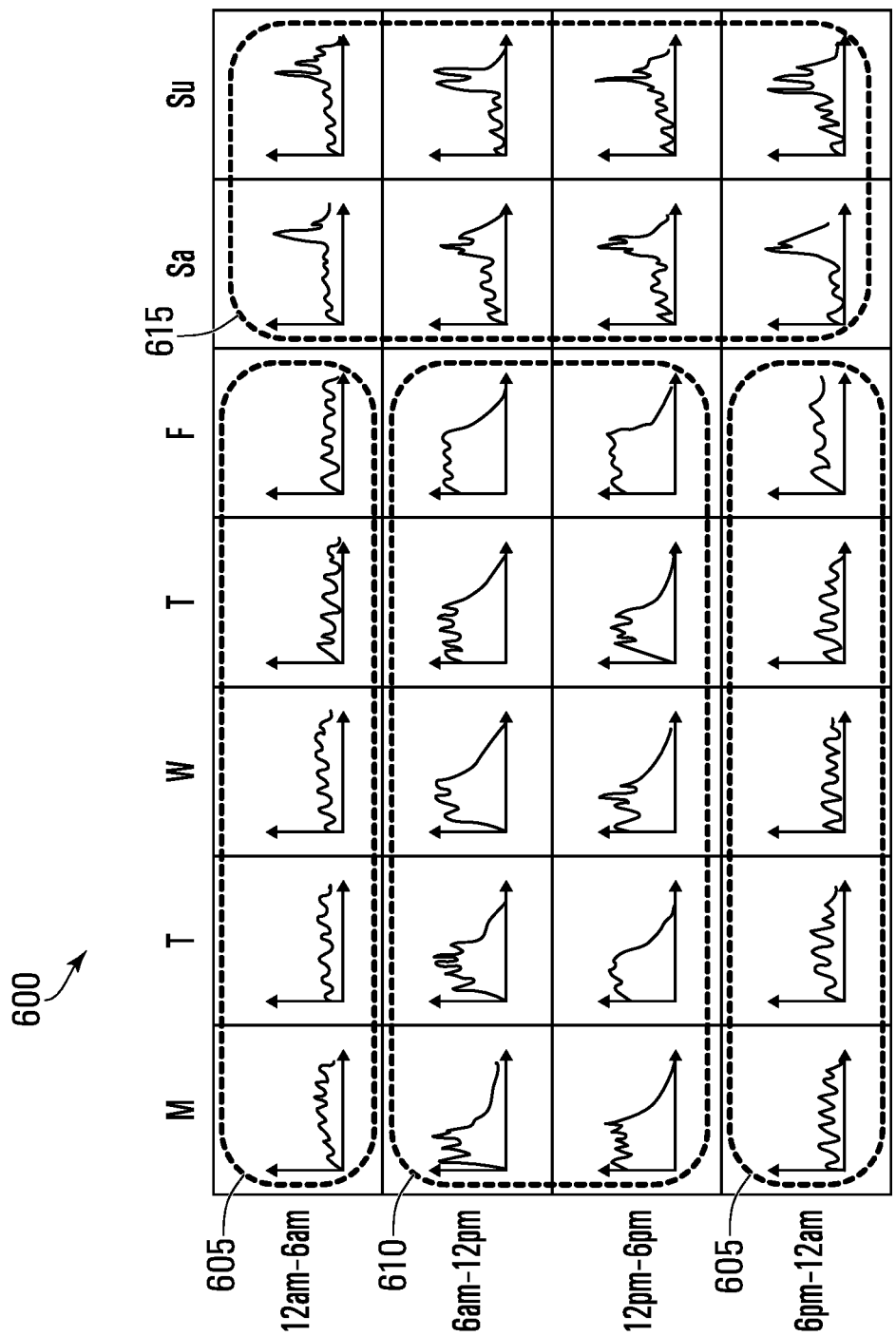
FIG. 6 illustrates an example of statistical intervals and pattern intervals during a week according to one example embodiment.

Referring now to FIG. 6, therein illustrated is an example of statistical intervals and pattern intervals in a week according to an example embodiment. The graphs inside the grid 600 represent the statistics (histograms) for each statistical interval. There are three pattern intervals in the week, 6 pm-6 am weekdays (PI 1) 605, 6 am-6 pm weekdays (PI 2) 610, and weekends (PI 3) 615. Therefore, there are three corresponding pattern intervals within the week.

FIGS. 5A, 5B, and 6 are relatively simple examples about how to define statistical intervals and pattern intervals. However, real world conditions are more complex. One statistical interval can be a group of time intervals. These time intervals can be any time period in a longer period, such as a week, for example, 8 am-9 am on Monday, 10:20 am-12:10 pm on Sunday. These time intervals can be discontinuous and have not-equal lengths. While it is preferable for statistical intervals to be relatively short in order to adapt to the changes of pattern intervals without relearning, the statistical interval should also be long enough to accumulate enough data to calculate reliable statistics.

Figure 7:
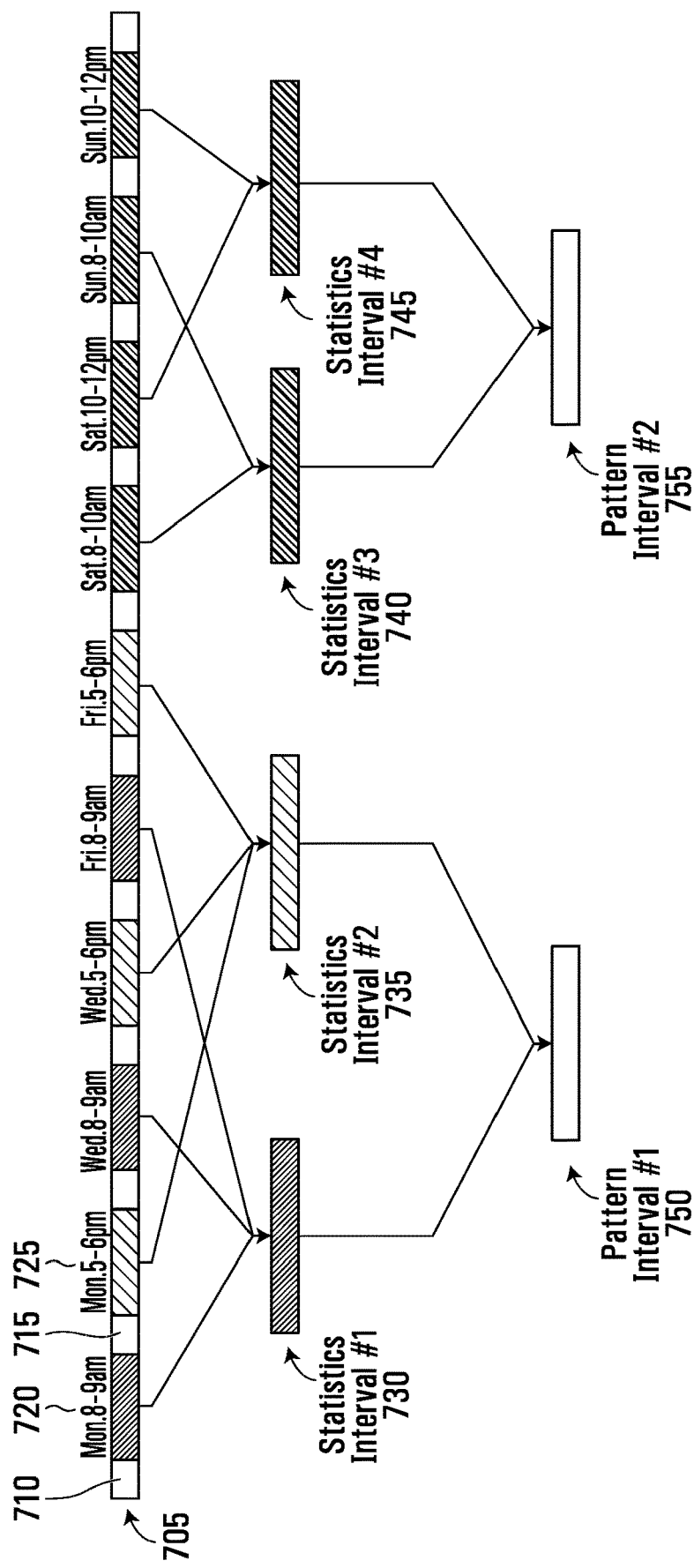
FIG. 7 illustrates an example of statistical intervals and pattern intervals during a week according to another example embodiment.

Referring now to FIG. 7, therein illustrated is an example of statistical intervals and pattern intervals in a week according to another example embodiment. The top level 705 shows time intervals in a week in one dimension. The rectangles without time notes (for example boxes 710, 715) were left blank to better illustrate this example. The rectangles with time notes (for example, time interval (Mon. 8-9 am) 720 and time interval (Mon. 5-6 pm) 725) are boxes representing the time intervals on which statistics were recorded. As shown, there are four statistical intervals 730, 735, 740, 745. Statistical interval #1 (730) is composed of three time intervals, which are 8-9 am on Monday, Wednesday, and Friday. Statistical interval #2 (735) is composed of three time intervals, which are 5-6 pm on Monday, Wednesday, and Friday. In this example, there are two pattern intervals 750, 755. Pattern interval #1 (750) includes two statistical intervals 730, 735; which are 8-9 am and 5-6 pm on Monday, Wednesday and Friday. The pattern interval #1 (750) may be, for example, the morning rush hour (8-9 am) and the evening rush hour (5-6 pm), which share similar activity or motion patterns if motion direction is not of interest, but speed of motion is of interest.

Similarly, pattern interval #2 (755) combines statistical interval #3 (740) (8-10 am on Saturday and Sunday) and statistical interval #4 (745) (10 am-12 pm on Saturday and Sunday). When the time intervals are relatively short, the statistics learned from the time intervals might be "noisy" or not robust. The time intervals, which share the similar activity patterns, may be combined into one statistical interval for more robust statistics. For greater clarity, pattern intervals are composed of statistical intervals and statistical intervals are composed of time intervals. The statistical models of the statistical intervals are constantly updated (e.g. the learning process is always running) as new motion vectors are added. As a result of this constant change, the statistics of the statistical intervals within a pattern interval may lose uniformity, in which case statistical intervals are re-grouped into new pattern intervals to support statistical interval (statistics or statistical model) uniformity within a pattern interval.

For the general case of one pattern interval with K number of statistical intervals, there is one histogram generated for each statistics interval. When a motion Hi occurs (for example motion direction is 120 degree), the calculation for the probability (p) of having this motion Hi in the pattern interval is as follows:

$$p = \sum_{i=0}^{K} w_i p_i \qquad (0)$$

where i is the index of the ith statistical interval, $w_i$ is the percentage (weight) of time length of the ith statistics interval relative to the pattern interval, and $p_i$ is the probability of the motion calculated from Hi.

Pattern intervals may be determined manually or automatically. After statistical intervals are defined and activity patterns known, users can define pattern intervals manually based on their knowledge of the scene by combining various statistical intervals. When pattern intervals change, users can modify the previously defined pattern intervals manually by re-assigning the statistical intervals amongst the pattern intervals.

Figure 8:
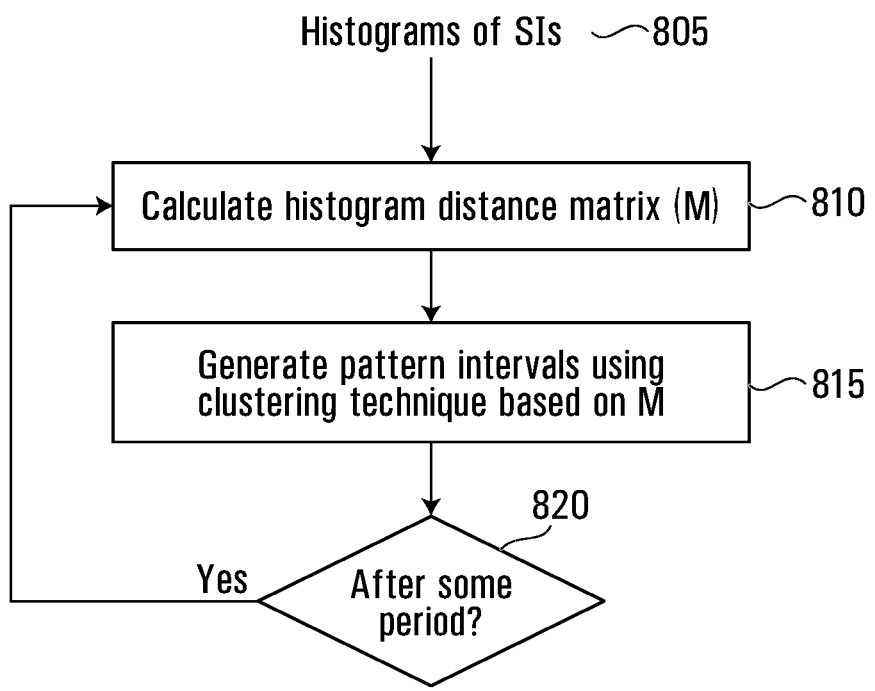
FIG. 8 illustrates a flow chart showing the process of combining statistical intervals into pattern intervals according to an example embodiment.

Referring to FIG. 8, therein illustrated is a flow chart showing a process to combine (cluster) statistical intervals into pattern intervals according to an example embodiment. The first step 805 is to record the data needed to generate the histograms (statistics) of the statistical intervals (Sis). This may be, for example, having a video capture device 108 with a field of view of a road recording and analyzing the video for motions (to generate motion vectors). The statistics may then be determined for the time intervals associated with the statistical intervals. A user may configure the time intervals and statistical intervals where the similarities and differences in conditions of a scene between time intervals may be known or partially known, otherwise default time intervals of statistical intervals may be preset, for example, at one hour, 30 minutes, 15 minutes, or 10 minutes.

Next, the histogram distances between each pair of statistical intervals are calculated (step 810). In doing this, a distance matrix (M) is generated. The matrix M dimensions are K by K. The element, $M_{ij}$, of the matrix is the histogram distance between the ith statistical interval and the jth statistical interval. A pattern interval may in some cases be a single statistical interval.

Based on the distance matrix M, an unsupervised clustering technique is applied to cluster (at step 815) the statistical intervals. The technique, for example, is K-medoids clustering. After the unsupervised clustering 815, the statistical intervals are clustered into clusters. One cluster corresponds to one pattern interval so the number of clusters equals the number of pattern intervals. The data points in each cluster are the statistical intervals of the pattern interval.

This clustering can be implemented automatically and re-executed after a period of time (step 820) to capture the evolution of the activity patterns. After some period, the statistical intervals can also be re-clustered manually, especially in situations in which the video surveillance system 100 provides excessive alerts or indications of anomalies which should not be anomalies.

The field of view, or scene, is divided into a grid of cells, which may be one or more macroblocks. The system learns the motion probability histograms for each cell, one for motion direction and another for motion speed. If the probability of current motion direction or motion speed for a cell is lower than a pre-defined threshold, the current motion is treated as an anomaly, i.e. unusual for that cell, in which case the cell is considered an unusual motion block (UMB).

Figure 9:
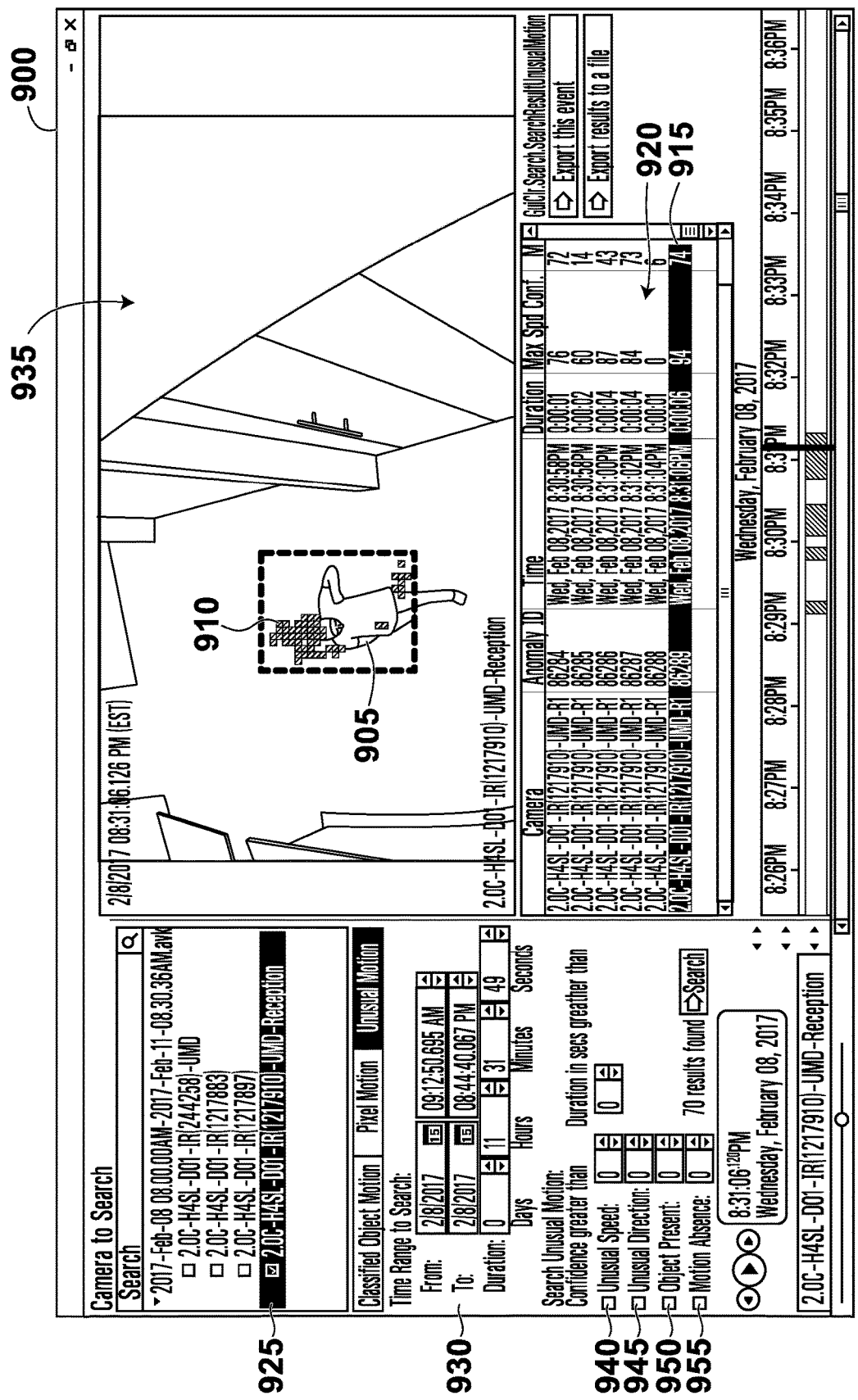
FIG. 9 illustrates a display generated by a video surveillance system according to an example embodiment.

Referring to FIG. 9, therein illustrated is a screenshot of a display generated by the video surveillance system 100 in accordance with the embodiment of FIG. 3. The screenshot 900 shows a video segment 915 in which a person 905 is moving through a hall way with UMBs 910, which are shown a translucent blocks. The UMBs 910 trail the movement of the person 905 for better visibility. The UMBs 910 may indicate the detection of unusual motion as determined from the motion vectors of the H.264 video compression. In an example embodiment, the UMBs 910 may be colored to distinguish anomalies by type, for example a blue UMB could represent a direction anomaly and a green UMB represent a speed anomaly. In another example embodiment, arrows derived from the motion vectors could be presented on the display or on each UMB to indicate the direction and magnitude of the unusual motion. The hallway shown in scene 935 is the equivalent of scene 300 as previously described.

The screenshot 900 also shows a list of unusual motion detections in the video segments which indicate search results 920 of a recorded video file 925 over a time range and duration 930 for any unusual motion. The time intervals or time periods of the statistical intervals and pattern intervals may be selected using another interface (not shown). The search results 920 may further be filtered by activities, for example unusual speed 940, usual direction 945, object presence 950, and motion absence 955.

Motion absence 955 is the case in which there is almost always motion for a given location during a statistical interval but suddenly there is a lack of motion. For example, the motion absence filter 955 may be useful for a very busy hallway at an airport that typically has a constant motion of people. The statistical model for such a cell could have constant motion. A lack of motion detected for a time period may then trigger an absent motion detection.

In this embodiment, the search results 920 return video segments which have at least one block in the scene 935 detecting unusual motion as per the statistical models calculated for each of the blocks. In an alternative embodiment, the search results 920 only return video segments which have a certain number of blocks with unusual motion detected in order to reduce detection of unusual motion from the visual effects such as random shadows or light or moving tree leaves. In a further embodiment, the UMBs 910 are differentiated into red and green blocks (colors are not shown). Since each cell or block has learned its own statistics, the cell are independent and each cell has its own statistics (statistical model). For example, a block may be red to indicate a very rare unusual motion, but the neighboring blocks are green indicating more common unusual motion. In a further embodiment, the UMBs 910 and the learned statistics from multiple UMBs are combined to detect anomalies based on the combined information.

In this embodiment, the recorded videos 925 are stored with associated metadata of unusual motions detected in the video and their time of detection. The search for unusual motion may only be a database search of the metadata instead of a time consuming processing of the video for the search results. Each of the video capture devices 108 has a video analytics module 224. The video analytics module 224 has the statistical models for the blocks of the scene in the field of view of the respective video capture device 108. The video analytics modules 224 further includes the statistical models for each of the blocks in the scene to detect unusual motions. The unusual motion detections are generated by the video analytics module 224 and provided as part of the metadata associated with the video being captured or recorded.

In alternative embodiments, the video analytics module 224 is located in the workstation 156, client devices 164, or processing appliance 148. In these embodiments, the recorded video is processed by the video analytics module 224 using the metadata after the video recording.

While this embodiment, FIG. 9, shows the screenshot 900 of the scene 935 from recorded video 925; the scene 935 can also be shown on a display of, for example, a client device 164 of a user in near real time. The video of the scene 935 can be sent to the client devices 164 for display after processing for unusual motion detection while the video is being captured by the video capture device 108. The user would be alerted to unusual motions by the UMBs 910.

Figure 10:
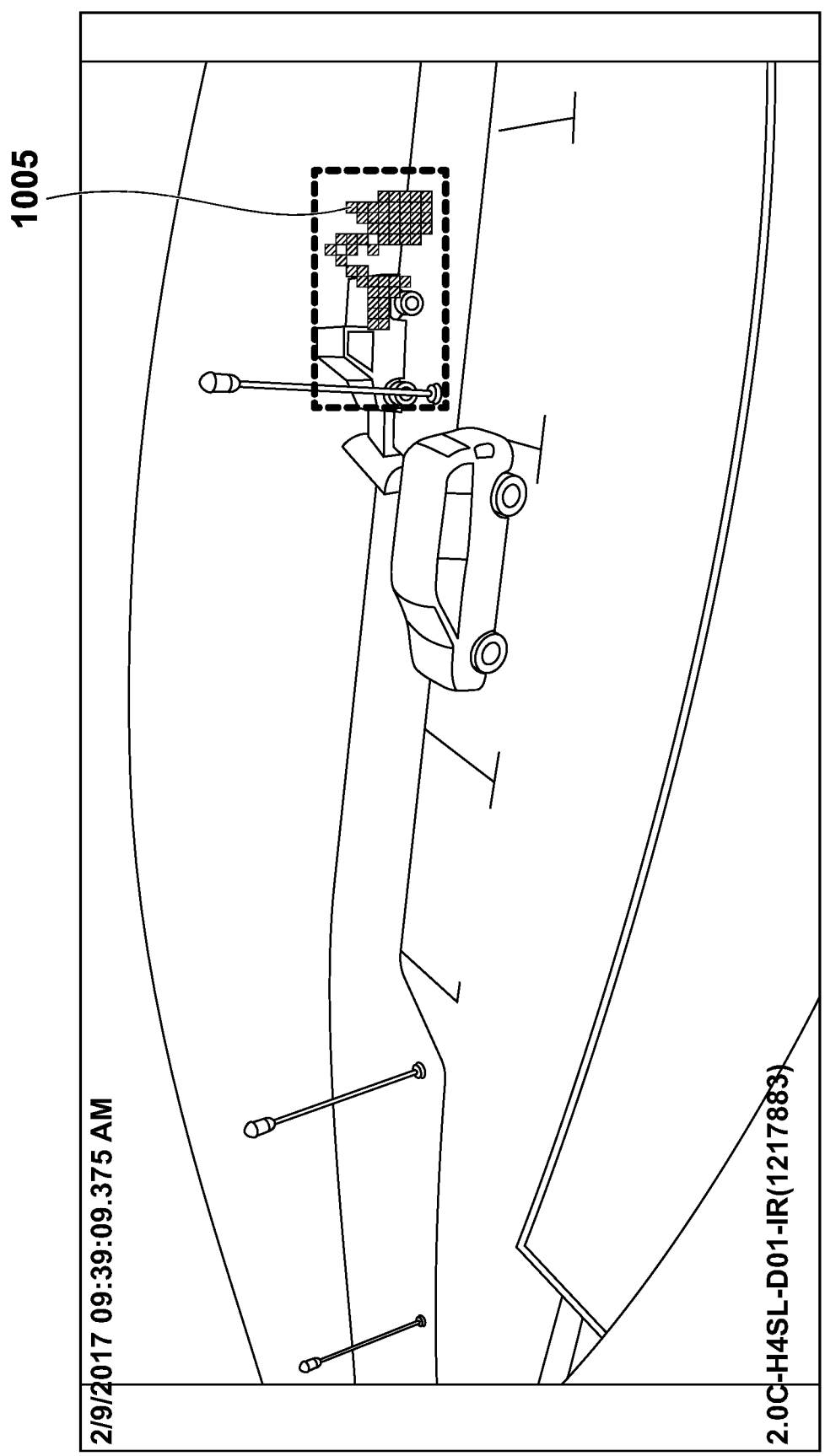
FIG. 10 illustrates another display generated by a video surveillance system according to an example embodiment.

Referring to FIG. 10, therein illustrated is a screenshot of a display generated by the video surveillance system 100 in accordance with an example embodiment. The scene has a snow plow 1005 moving relatively quickly down the sidewalk on which usually only people are walking. As shown, the snow plow 1005 has unusual motion blocks trailing indicating unusual speed. While not shown, "unusual speed" or other textual or graphic indicators may also be displayed with the group of UMBs related to the snow plow 1005.

Figure 11:
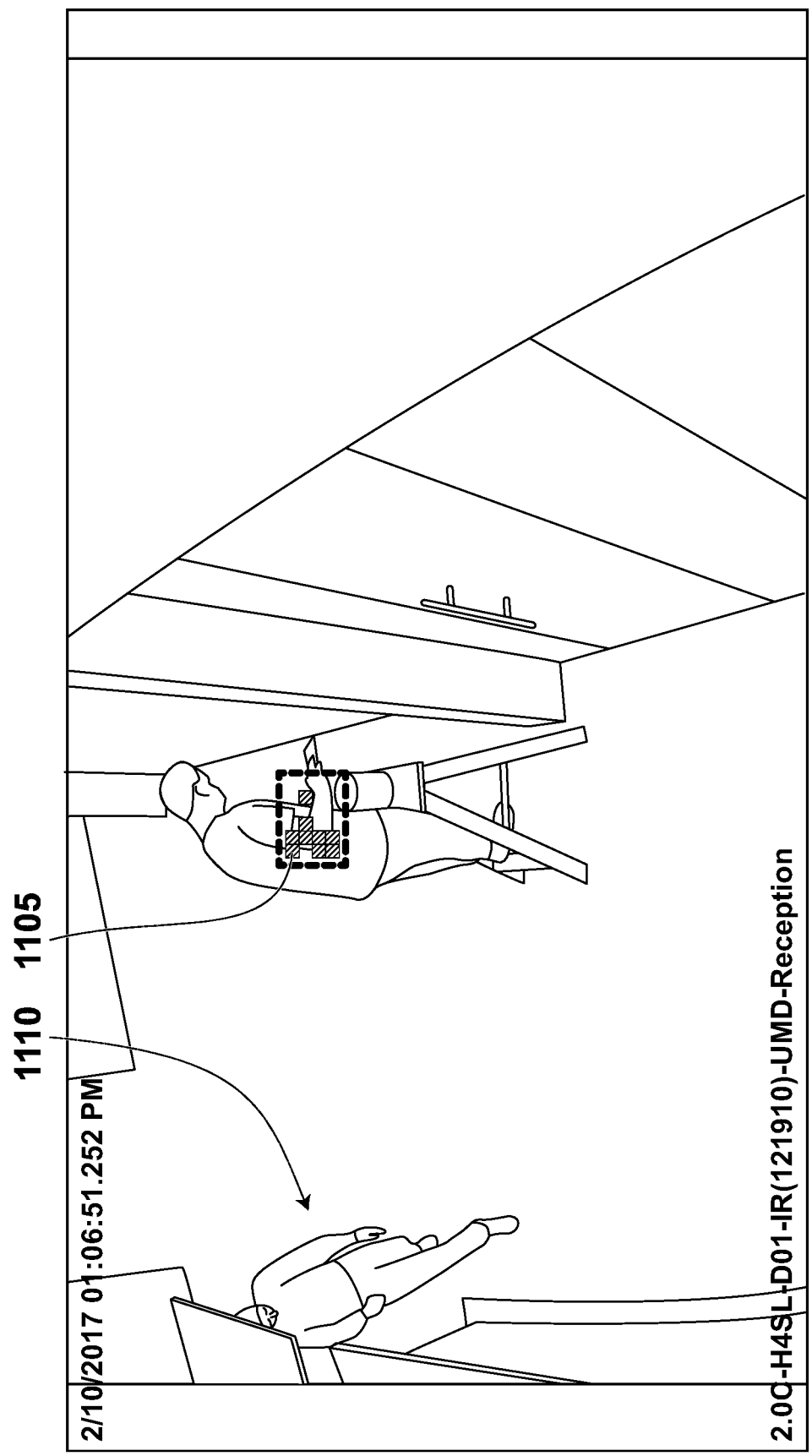
FIG. 11 illustrates another display generated by a video surveillance system according to the embodiment of FIG. 9.
Figure 12:
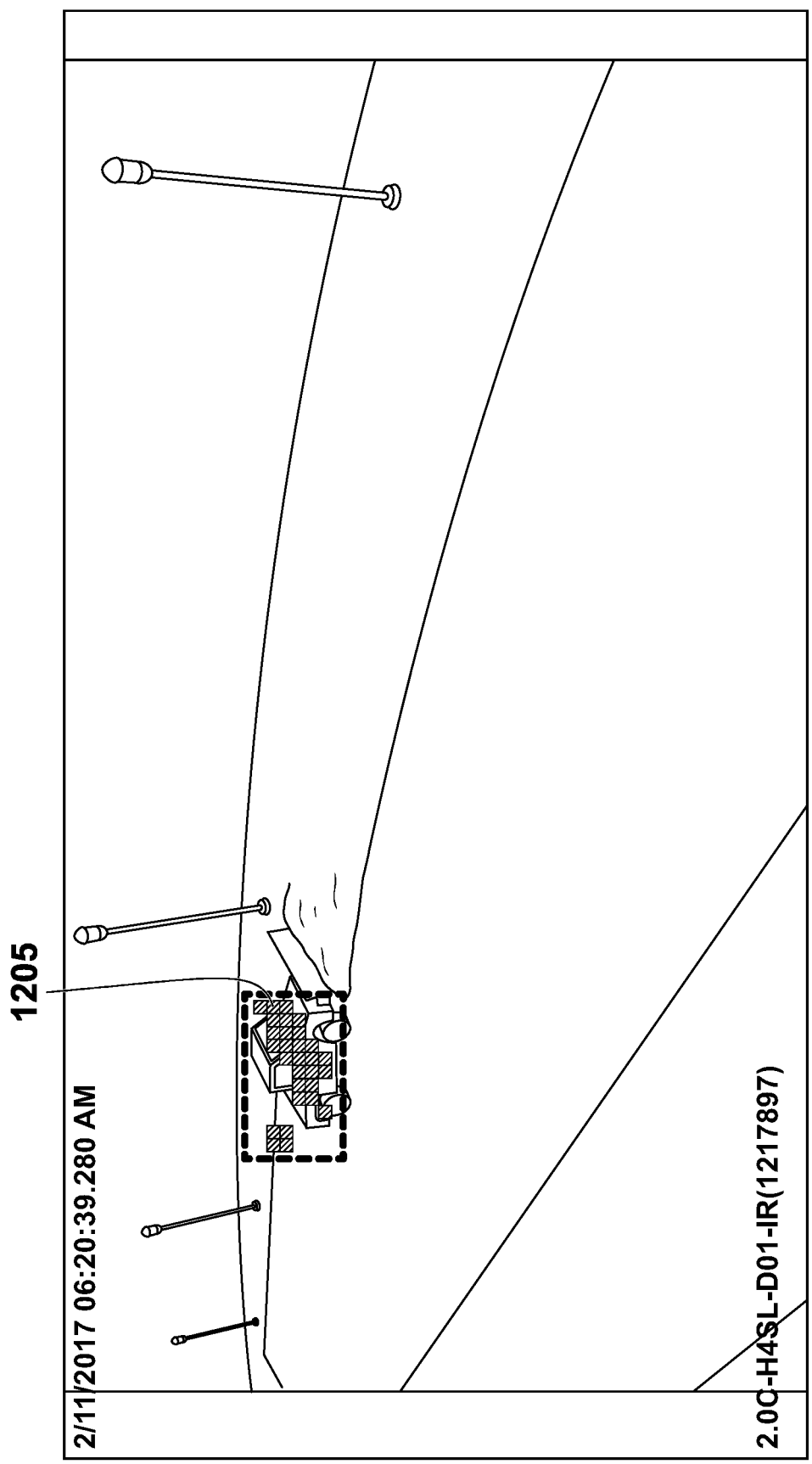
FIG. 12 illustrates another display generated by a video surveillance system according to the embodiment of FIG. 10.

Referring to FIG. 11, therein illustrated is another screenshot of a display generated by the video surveillance system 100 in accordance with the embodiment of FIG. 9. The scene shows a walking person 1110 without UMBs. This should be the case as people walking in this hallway is not unusual. The scene also shows a painter 1105 painting, but with UMBs. This should be the case as the motion of people (painter 1105) painting in this hallway is not usual. Referring to FIG. 12, therein illustrated is a screenshot of a display generated by the video surveillance system 100 in accordance with the embodiment of FIG. 10. The scene has a snow plow 1205 moving on the road, but going in the wrong direction. As shown, the snow plow 1205 has UMBs trailing indicating unusual motion. While not shown, "unusual direction" or other textual or graphic indicators may also be displayed with the group of UMBs of the snow plow 1205.

Automatic Pattern Intervals

An alternative algorithm to that described above can also be used to determine pattern intervals. In a surveillance video in most cases a scene has "well-defined" activity patterns. For example, for outdoor scenes activity patterns could be divided into daytime and nighttime, or a high activity time during some part of the day and a low activity time during the rest of the day. Activity patterns could be also different for weekdays and weekends. For indoor scenes, activity patterns may be business hours and non-business hours. For example, business hours may be 8 am-7 pm on Monday, Wednesday, and Thursday and the rest of week is non-business hours.

In general, motion patterns repeat themselves within day or week intervals allowing pattern intervals to be identified in a time interval, for example a week. To identify these patterns a week long interval can be divided into discrete time period intervals, whether these time period intervals are uniform or not, and motion statistics (features) can be calculated for each discrete time period. In the example disclosed below, an hour will be used as the discrete time period interval. The statistics associated with each discrete time period interval may be the statistics used for probability calculation and anomaly detection, such as the distributions and histograms of motion vector magnitude and direction; however different features can be added to or used instead of the features used for the probability calculations. Experiments demonstrated that the noisiness of motion vectors as a feature provided good clustering results.

Pattern intervals are defined through the process of clustering statistics for different discrete time period intervals so that the discrete intervals with similar statistics are placed in the same cluster, which is used as a pattern interval. The number of clusters used can vary. Before the clustering algorithm is run, statistics are accumulated for all discrete time period intervals in a period such as a week. The clustering runs in two stages: day level and hour level. In the first stage clusters of days are identified. By comparing the collections of statistics for discrete timer periods (e.g. hours) for all days one or two clusters of days may be identified. The two clusters of days usually correspond to weekdays and weekends. If statistics for all days are similar, all days may be placed in a single cluster. Then statistics of discrete time period intervals (e.g. hours) within each day level cluster are clustered so that each day level cluster may have one or two hour level clusters (intervals). These hour level clusters often correspond to daytime and nighttime, or business hours and non-business hours. However, as before it is possible that in the activity for all the hours in each day in a cluster of days is similar and cannot be distinguished into two different patterns. In this case, all the hours in that cluster of days is considered as one cluster of hour intervals.

The hour level clusters may not be contiguous. The above solution limits the intervals used to a maximum of four pattern intervals which fits most real word surveillance systems 100 in which the motion in the field of view of a video capture device 108 changes on a weekday vs. weekend basis and a day vs. night basis. In an alternative embodiment, more than two clusters can be identified.

Figure 20:
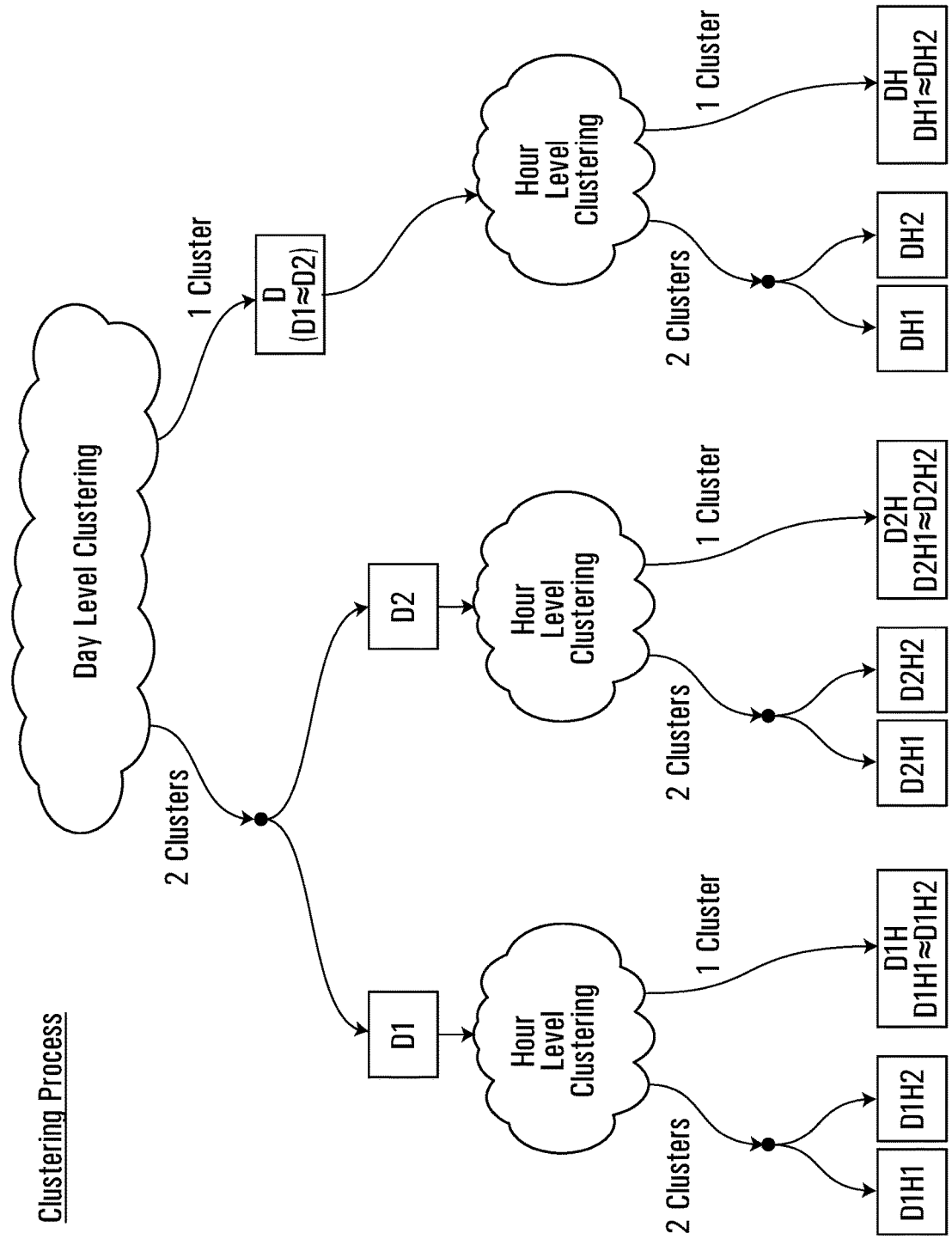
FIG. 20 illustrates a decision tree for the clustering process according to an example embodiment.

FIG. 20 illustrates a decision tree showing the above described clustering process, according to an embodiment. At the day level clustering decision, either two day level clusters are formed, D1 and D2, or one day level cluster D is formed, in the case in which D1 is approximately similar to D2. Each day level cluster, either both D1 and D2, or just D, go through the hour level clustering. Each hour level clustering process results in either two hour level clusters, H1 and H2, or one hour level cluster H, in the case in which H1 is approximately similar to H2. The end result is that there are five possible cluster combinations as illustrated in FIG. 22, according to an embodiment. These are: (1) D1H1, D1H2; and D2H1; and D2H2; (2) D1 H; D2H1; and D2H2; (3) D1H1; D1H2; and D2H; (4) D1H and D2H; and (5) DH.

FIG. 21 illustrates an example of a typical distribution of clusters after the clustering process according to an embodiment. As shown, D1 represents Sunday and Saturday and D2 represents Monday to Friday. Within D1, H1 represents times in the evening and early morning; and H2 represents the daytime. Within D2, H1 represents longer times in the evening and morning and H2 represents typical working hours and travel hours.

If only one pattern interval is identified, it would be the whole week; if there are two pattern intervals, they may, for example, be 7 am-7 pm for the whole week (daytime for outdoor scene), and 7 pm-7 am for the whole week (night time for outdoor scene); if there are three pattern intervals, they may be, for example, 9 am-9 pm for Monday to Friday (working hours during weekday), 9 pm-9 am for Monday to Friday (non-working hours during weekday) and 24 hours for Saturday and Sunday (the weekend); if there are four pattern intervals, they may be, for example, 7 am-11 pm for Monday to Friday (working hours during weekday), 11 pm-7 am for Monday to Friday (non-working hours during weekday), 11 am-6 pm for Saturday and Sunday (activity time during weekend), and 6 pm-11 am for Saturday and Sunday (non-activity time during weekend).

The above limitations simplify calculations (and save processing time) and cover most situations. In the example set out below, one hour is used as a discretization unit in an algorithm, i.e. activity statistics are compared for each hour to identify patterns. In implementation other discretization units could be substituted.

Figure 13:
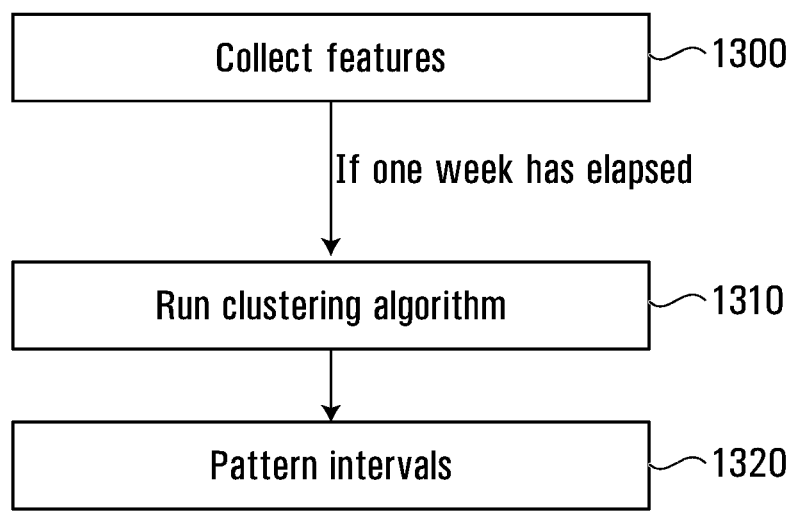
FIG. 13 illustrates a flow chart of an algorithm workflow according to an example embodiment.

Referring to FIG. 13, therein illustrated is an algorithm workflow in accordance with an example embodiment. At step 1300, statistical parameters based on features are calculated and collected; these features describe the activity for each hour interval during a week, so that there will be 24×7=168 intervals. At step 1310, a clustering algorithm is run to identify clusters among the hour interval features. The output, step 1320, of the algorithm is clusters that define pattern intervals within the week.

The updating of the statistics (features) for each discrete time interval (hour) may run constantly (i.e. after each frame), while the clustering algorithm runs periodically. In a typical implementation, a clustering algorithm will be run every week.

Hour statistics (x) update for each frame t using exponential averaging of a feature observation (s) for frame t:

$$x(t) = \frac{s(t)}{N} + x(t-1)\frac{N-1}{N} \quad (1)$$

wherein N is a parameter of the algorithm which is interpreted as the effective number of frames in averaging interval. For t<N the simple moving averaging or bias correction for exponential average is used. In a typical implementation the value N is equal to the total number of frames in 8 hours, which means that statistics are collected over the past 8 hours or 8 weeks of calendar time for each hour interval. The parameter N governs the trade-off between robustness (amount of statistics) and flexibility, i.e. adaptation to activity change (for example due to seasons, daytime savings, etc.).

The discrete time interval statistics might be the same statistics used for probability calculation and eventually for anomaly detection, e.g. distribution/histograms of motion vector magnitude and direction. However, it is useful to consider different features as an addition to or instead of the features used for probability calculations. Experiments demonstrated that using the noisiness of motion vectors (as described below) provide good clustering results.

Each compression macroblock in a video frame may or may not have a motion vector associated with it. Temporal filtering may be used to check consistency of the motion vectors in location and time and to filter out the motion vectors that are noise and do not correspond to real moving objects. Thus, for each frame the ratio of the number of noisy motion vectors to the total number of motion vectors is calculated. This ratio may be used as a one dimensional feature in the clustering algorithm. In general, more statistical parameters may be extracted and used as a multidimensional feature for clustering.

The one dimensional feature is averaged (using exponential smoothing as described above). In an example embodiment, 24×7 averaged statistics are collected, one for each hour in a week, to create 24×7 values. These values are clustered to identify pattern intervals as described below.

Basically, the one dimensional feature describes the noisiness of motion vectors in a given scene for different hour intervals. The reasons for selecting the one dimensional feature is that during night (low illumination condition) or non-activity time, the noisiness of motion vectors tends to be higher than during day or activity time. Therefore the one dimensional feature can be used to distinguish these different patterns in a scene.

Figure 14:
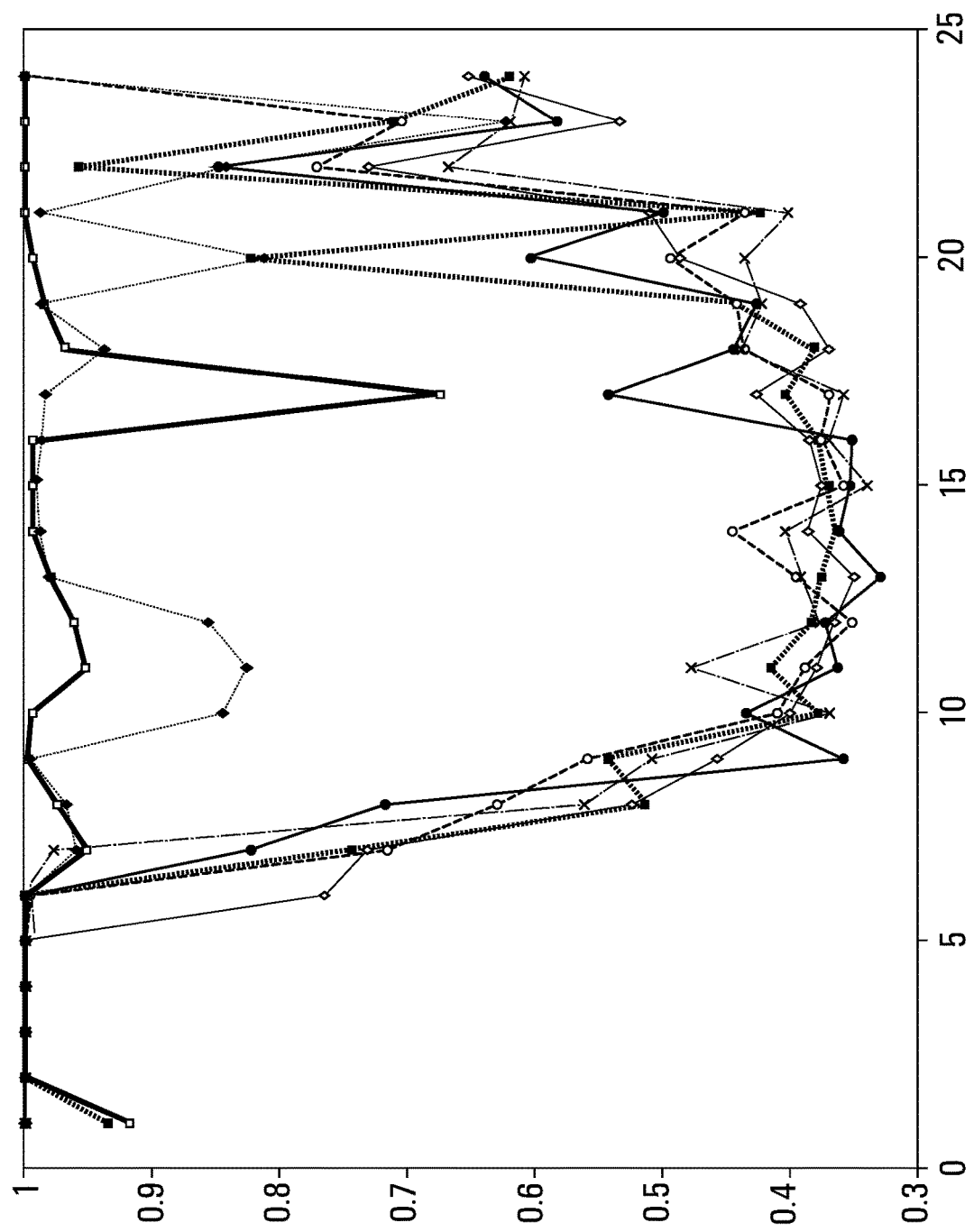
FIG. 14 illustrates a chart showing the noisiness of motion vectors according to an example embodiment.

An embodiment of an example of the one dimensional features collected from a week of data for an indoor office is shown in FIG. 14, in which the X axis represents the time for each hour [1 to 24]; and the Y axis represents the noisiness of motion vectors, [0 to 1]. The different lines represent different days in a week. Each of the seven lines in FIG. 14 correspond to a day in a week. From FIG. 14, it is shown in this example, that during non-working hours (including the weekend), the noisy motion level is much higher than during working hours because there are fewer activities during the non-working hours.

Figure 15:
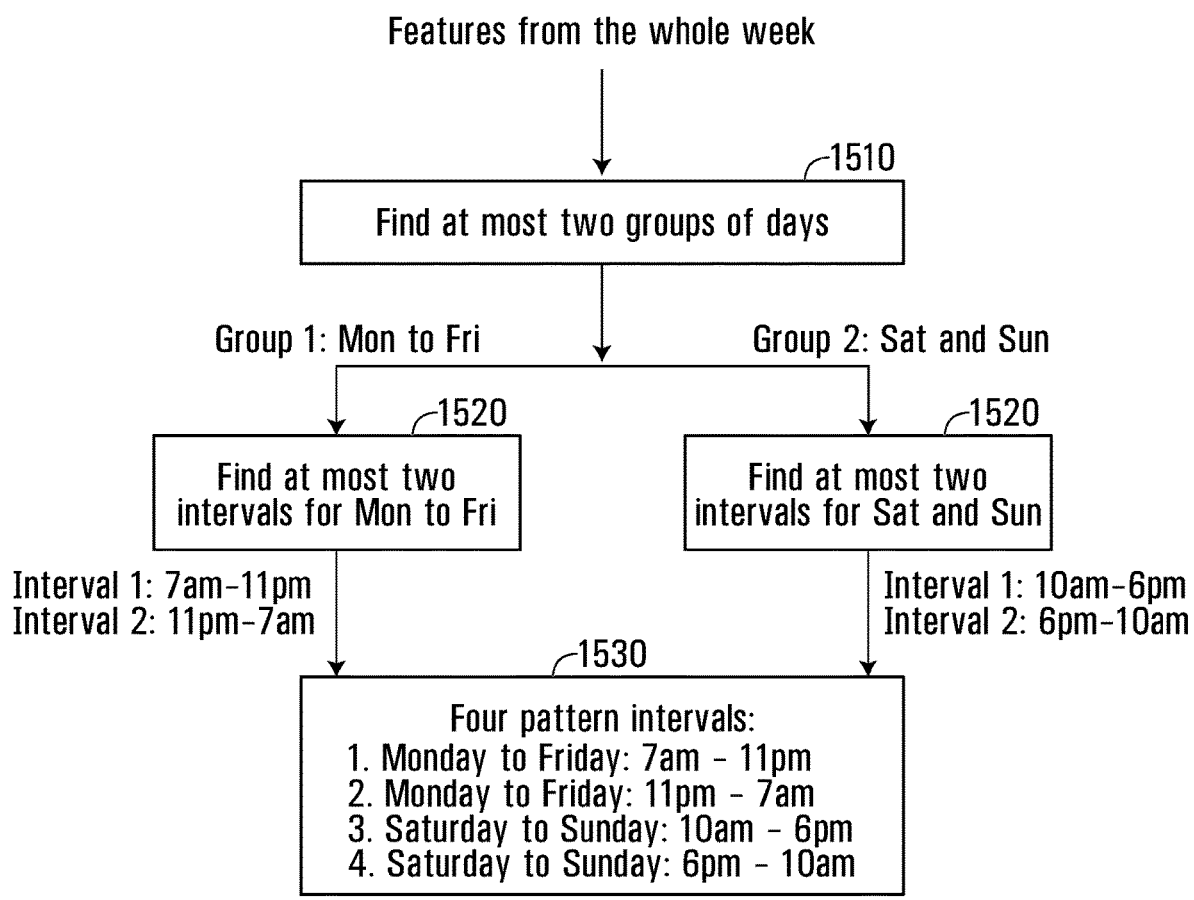
FIG. 15 illustrates a flow chart showing a clustering algorithm according to an example embodiment.

Based on the feature described above, the clustering algorithm can be performed to generate pattern intervals for a week. There may be two steps in the clustering algorithm, an example embodiment of which is shown in FIG. 15.

In the first step 1510, the clustering algorithm is run on the feature for the whole week to obtain at most two (not necessarily contiguous) groups of days (i.e. two clusters) in a week.

Typically, in this step, work days vs non-work days are determined and the seven days in a week are partitioned into two groups. Note that it is also possible that the whole week (i.e. all 7 days) belongs to a single cluster/group. As an example in the embodiment show in FIG. 15, the two clusters/groups represent weekdays and weekends, respectively.

In the second step 1520, for each cluster (i.e. each group of days) obtained in step 1, the similar clustering algorithm runs on the feature collected from the days in this group to obtain at most two time intervals for this group of days resulting in no more than four intervals (step 1530).

This step is typically used to determine day time vs. night time, or activity time vs. non-activity time. Note that it is possible that the whole day (24 hours) in a given group of days belongs to one cluster, which means two different patterns during these days cannot be distinguished.

Since the algorithm determines at most two clusters for days in a week, the number of possible combinations to check is $c_7^7 + c_7^6 + c_7^5 + c_7^4$, where $C_m^n$ is the combination (without repletion) of m elements from collection of n elements: $c_7^7$ means there are 7 days as one group, $c_7^6$ means that there are any 6 days as one group and the rest as one day as another group. In order to find out the best combination of days for motion patterns, a segmentation algorithm, such as the Otsu segmentation algorithm can be used. To this end, for each combination of days the sum (V) of the (not normalized) intra class variance is calculated as:

$$V = \sum_C \sum_i (d_i^c)^2 \qquad (2)$$

where $d_i^c$ is the distance between nosiness of motion vectors for day i in the cluster c and the average noisiness for all days in the cluster c. The outer sum in this equation is taken over clusters c. The number of clusters can be 1 or 2. If the number of clusters is 1, it means no outer summation (see explanation for 1 cluster case below). The difference with the traditional Otsu method is that multidimensional variables are clustered: noisiness for each day is a 24 dimensional value, each dimension corresponds to noisiness for a one hour interval. A squared distance between multidimensional noisiness for two different days is defined as the sum of squares of difference for each hour intervals. In this line the squared distance between noisiness for a given day i and the average day nosiness from cluster c is calculated as:

$$(d_i^c)^2 = \sum_h (x_h^i - \mu_h^c)^2 \qquad (3)$$

where $x_h^i$ is noisiness for hour h for day i (for example, the noisiness for time interval 3 pm-4 pm on Wednesday) and $\mu_h^c$ is the averaged noisiness for all days in cluster c (for example, Monday, Tuesday, Wednesday, and Thursday). $\mu_h^c$ is 24 dimensional vector: h=1, 2, ..., 24. h-th element of this vector is defined as:

$$\mu_h^c = \frac{1}{N_c} \sum_{j \in C} x_h^j \qquad (4)$$

The sum in eq. (3) over h is taken for 24 hour intervals, i.e. 24 summations. The sum in eq. (4) is taken over all days (index j) that belong to a given cluster c. $N_c$ in eq. (4) is the number of days in the cluster c.

To make a connection of the formulation to other formulations of the Otsu algorithm and a discriminant method, such as the Fisher discriminant method, the normalized intra class variance $\sigma_c^2$ can be used, defined as:

$$\sigma_c^2 = \frac{1}{N_c} \sum_{i \in C} \sum_h (x_h^i - \mu_h^c)^2 \quad (5)$$

In this formulation, instead of V (see eq. (2)) the expression for V/N can be used:

$$\sum_c w_c \sigma_c^2 \quad (6)$$

where $w_c = N_c/N$ is the probability that a day belongs to the cluster c. N is equal to 7, the number of days in a week.

In the line of Otsu segmenting method, after calculating V or V/N for each possible combinations of days in two groups the combination which corresponds to the minimum of V can be determined. That combination provides a choice of pattern interval for days. The formulation (eq. (2)) allows the Otsu method to be extended to compare the value V not only for different combinations of days in two groups but also to compare V for two groups with V for one group (no summation over c in eq. (2)). Thus, the best pattern intervals for days among all $c_7^7 + c_7^6 + c_7^5 + c_7^4$ combinations can be determined by selecting the case that corresponds to minimum of V. The results from this step could be only one group of the days, e.g. Sunday-Saturday; or two groups, e.g. Monday-Friday and Saturday-Sunday.

After clusters for groups of days have been determined, for each group of days a similar approach is applied for clustering hour intervals into at most two groups. The approach is the same as described above with the only difference that now we are dealing with a simpler case: one dimensional feature vs 24 dimensional feature. For each group of days, we calculate V as follows:

$$V = \sum_c \sum_h (\bar{x}_h - \mu^c)^2 \quad (7)$$

where $\bar{x}_h$ is the average noisiness of hour interval h for this group of days, $\mu^c$ is the average nosiness for the all hour intervals in cluster c. Here the number of clusters could also be 1 or 2. A one cluster case means the all 24 hour intervals are combined in a single group of time intervals. More precisely, $\bar{x}_h$ and $\mu^c$ are defined as $$\bar{x}_h = \frac{1}{N_c} \sum_{i \in C} x_h^i \quad (8)$$

$$\mu^c = \frac{1}{M_c} \sum_{h \in C} \bar{x}_h \quad (9)$$

where $N_c$ is the number of days in the group, and $M_c$ is the number of hour intervals in cluster c.

Since we limit the inquiry to find at most two time intervals in a day, theoretically the possible number of combinations is $\Sigma_{i=1}^{12} c_{24}^i$. However, some constraints can be introduced. For example, only contiguous intervals may be considered. Also, only intervals containing at least three hours may be considered. Also the circular nature of the 24 hour interval means that the time point 24:00 is the same as the time point 00.00. After applying these constraints, the possible number of combinations to consider is reduced to 24*(12−3).

The same approach can be used to calculate the intra class variance (eq. (7)) for each combination of hour intervals. The combination which has the minimum value V would provide cluster options. Again as before, the value of V for both two clusters and one cluster cases can be compared.

For example, as a result of clustering the following may be determined: for Sunday-Saturday there is only one time interval, 00:00-24:00; for Monday-Friday there are two time intervals, 7 am-7 pm and 7 pm-7 am.

Sometimes for both cases of clustering (for day and hour intervals) it may be preferable to choose the one cluster option over the two cluster option if the difference between these options is small. The reason for that is one cluster option provides larger statistics and might be more reliable for anomaly detections. To this end, besides the sums of intra class variances V (eq. (1) or (7)) for two cluster options, the Fisher discriminant can also be calculated. In cases when the Fisher discriminant is smaller than the predefined threshold the option of one cluster can be chosen even if this option corresponds to larger V.

User Interface

Figure 16:
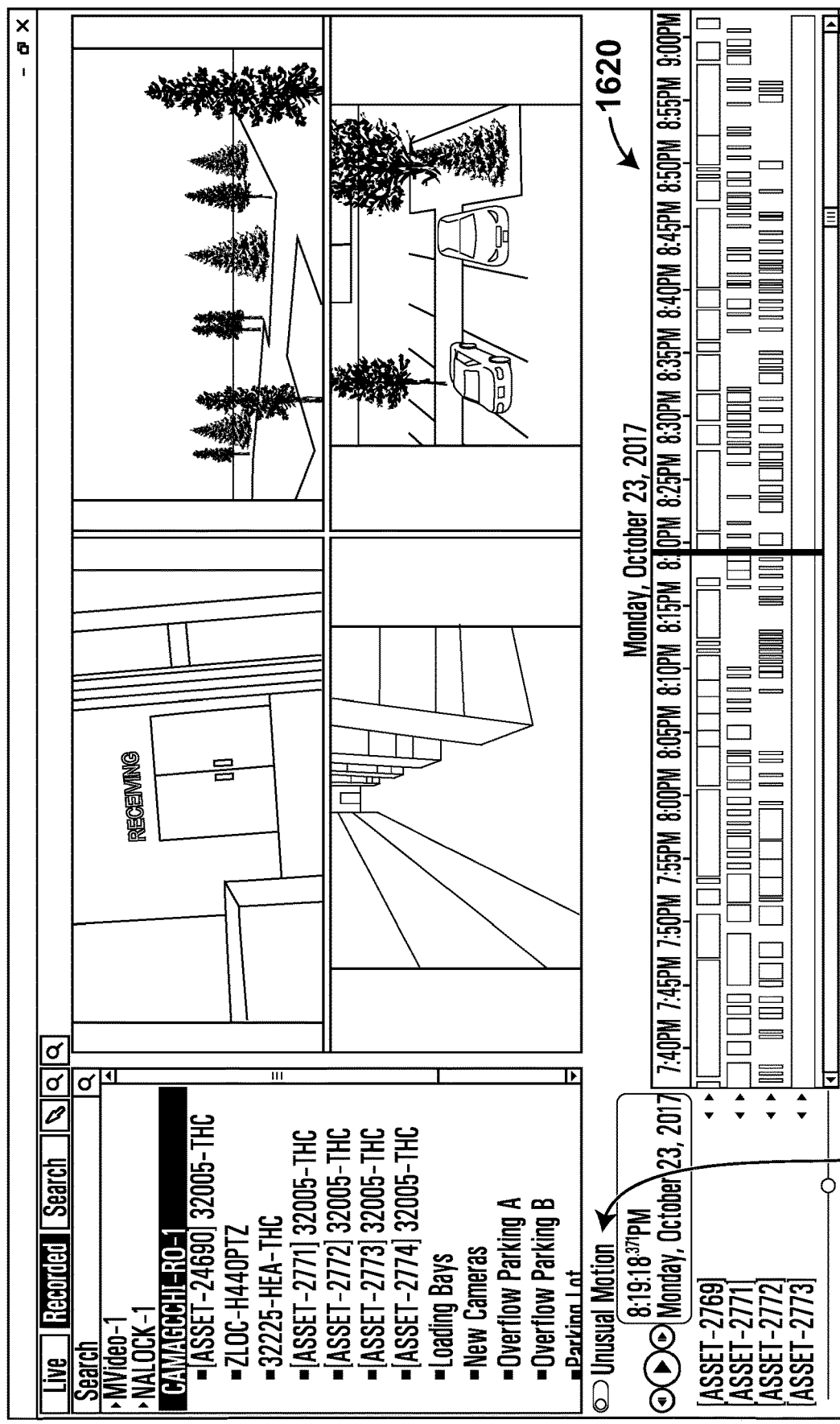
FIG. 16 illustrates a user interface according to an example embodiment.

FIGS. 16 to 19 illustrate an embodiment of a user interface according to an aspect of the invention. As shown in FIG. 16, the feature described herein may be activated by a toggle 1610. FIG. 16 illustrates a user interface wherein toggle is "off" and unusual motion is not being flagged. In this position the user interface displays recorded video (which may be displayed in one color) and motion pixel detection results (which may be displayed in a different color).

Figure 17:
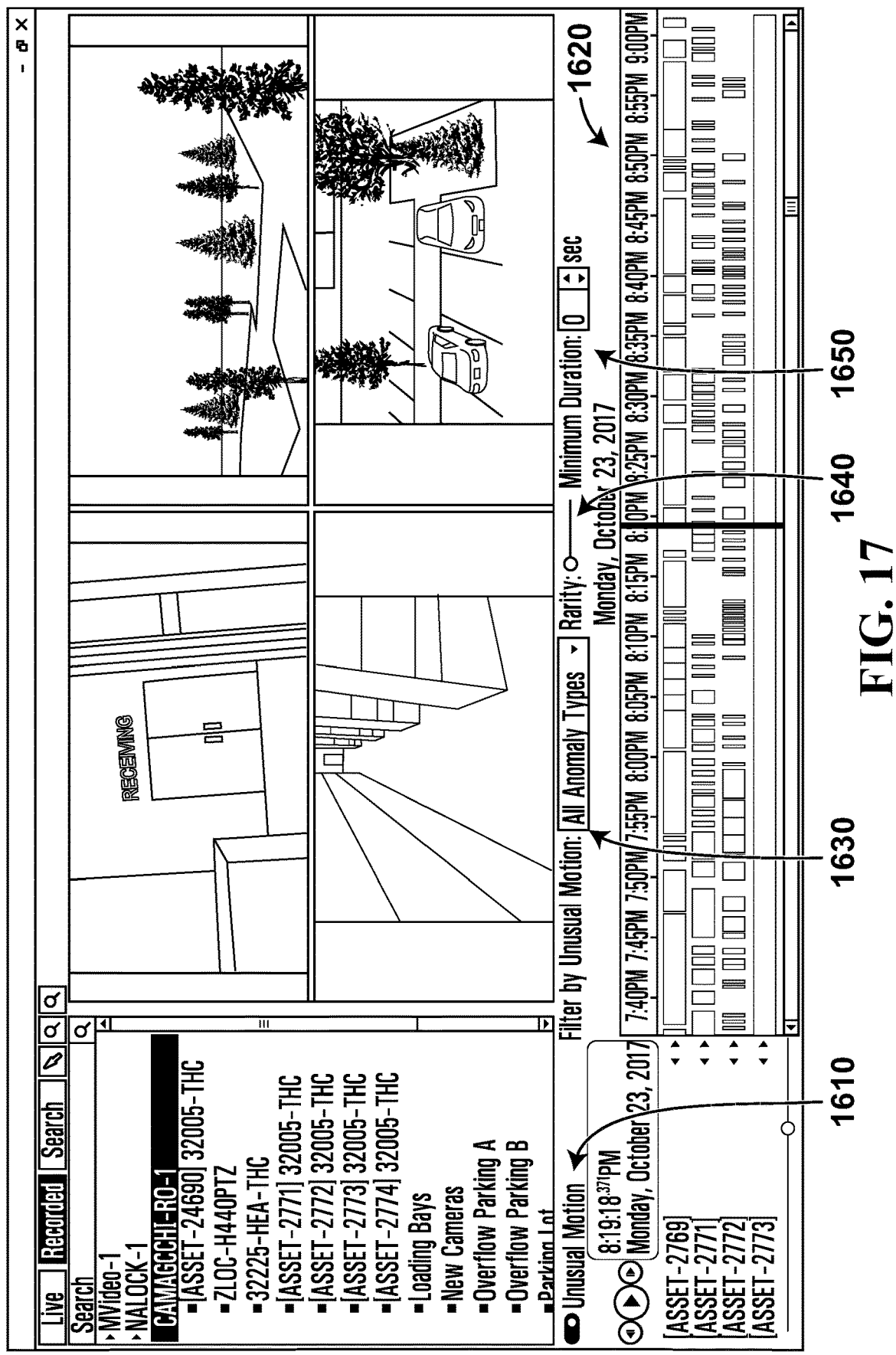
FIG. 17 illustrates a user interface showing filter options according to an example embodiment.
Figure 18:
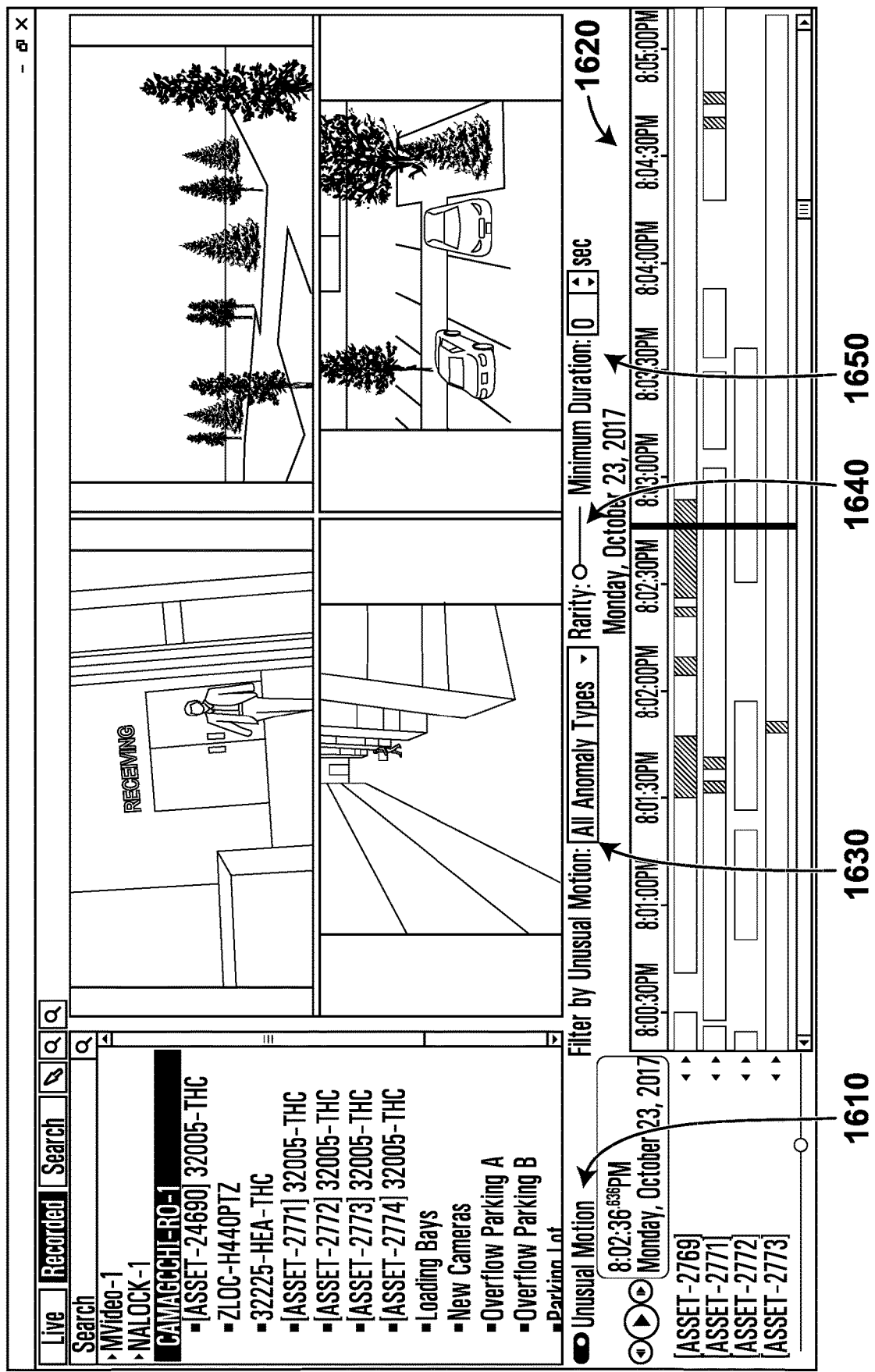
FIG. 18 illustrates a user interface after selection of filter options according to an example embodiment.
Figure 19:
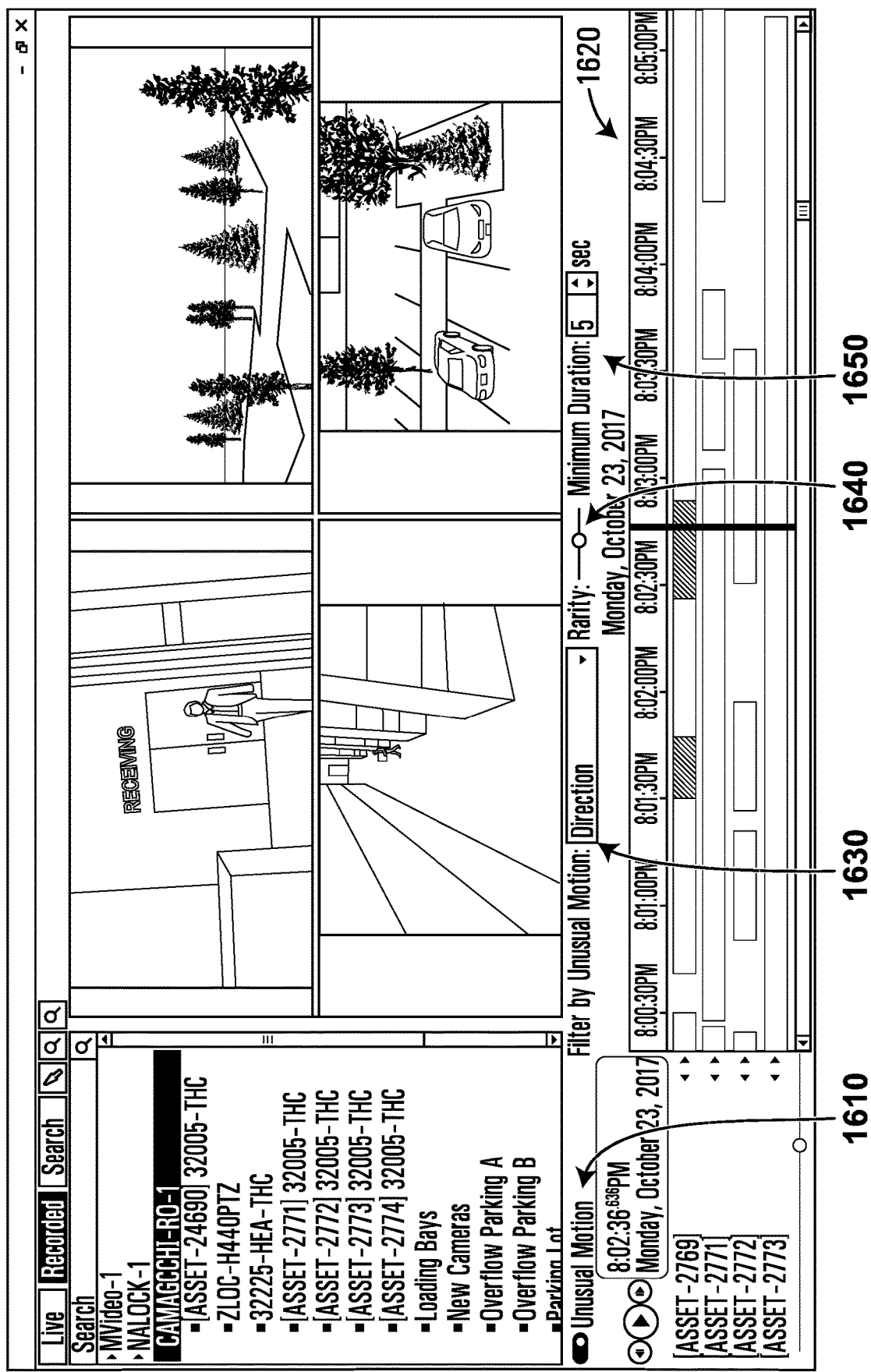
FIG. 19 illustrates a user interface after selection of alternative filter options according to an example embodiment.

As shown in FIG. 17, when toggle 1610 is switched to "on", filter options 1630 are also made available on the user interface presented to the user to allow the user to adjust the data shown in the timeline, as shown in FIGS. 18 and 19. The timeline 1620 is adjusted so that only occurrences of unusual motion are darkened (as shown in a darker color on timeline 1620).

In FIG. 19, the rarity bar 1640 has been increased to about the midpoint position so that more common "unusual motion" will not be darkened. Rarity bar 1640 enables users to adjust the threshold by which "unusual motion" is determined and can thereby filter out motion that is less "unusual". Likewise a minimum duration 1650 has been selected, so that shorter incidents, in this example, less than 5 seconds as selected will not be darkened, although longer durations may be selected. Also a type of unusual motion, in this case "Direction" has been selected, so that only incidents of unusual motion related to an unusual direction of movement will be darkened. Other filters that may be selected include: crowd gathering, i.e. display only an unusual total amount of motion; speed, i.e. display only unusually fast or slow motion; absence, i.e. display only the unusual lack of motion; classification, i.e. filter the displayed results by classification, for example as a person or vehicle; size, i.e. filter the displayer results by a minimum size of the object; and, location, i.e. filter the results based on a selected portion of the field of view.

The system and method described herein according to various example embodiments allows for improved playing back of a plurality of video feeds at the same time. For example, the number of video feeds that has video of interest available at any given temporal position is tracked and a playback layout that is appropriate for that number of available video feeds is determined. By playing back the video feeds within the playback layout, only those video feeds that have available video of interest are displayed. This may lead to more efficient use of the area of the display region. For example, sub-regions of the display region are not left empty due to a video feed not having video of interest at a given temporal position. Furthermore, when played back within the playback layout, the area of the display region is used more efficiently to display those video feeds that have video of interest available.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A video surveillance system comprising:
   a storage device storing, during operation of the video surveillance system, a plurality of video recordings; and
   a client device communicatively coupled to the storage device, the client device including at least one input device and a user interface responsive to the at least one input device, and the user interface being configured to:
   generate a plurality of displayed filter options operable to accept user input, each of the displayed filter options in respect of a different search criteria in relation to unusual motion detection, and the displayed filter options including one or more of a drop down filter option and a bar filter option; and
   cause the plurality of video recordings to be searched so that at least one portion of one of the video recordings is identified as an at least one unusual motion search result for the user input.

2. The video surveillance system as claimed in claim 1 wherein the client device is one of a personal computer, a laptop, a tablet, a Personal Data Assistant (PDA), a cell phone, and a smart phone.

3. The video surveillance system as claimed in claim 1 wherein the user interface is further configured to generate a displayed timeline within which at least one unusual motion search result appears as a rectangle.

4. The video surveillance system as claimed in claim 1 wherein a first of the displayed filter options corresponds to setting a rarity threshold, and a second of the displayed filter options corresponds to a minimum incident duration in seconds.

5. The video surveillance system as claimed in claim 4 wherein a third of the displayed filter options corresponds to setting a classification type.

6. The video surveillance system as claimed in claim 1 further comprising a plurality of cameras communicatively coupled to the storage device, the cameras being configured to capture the video recordings.

7. The video surveillance system as claimed in claim 1 wherein the at least one portion of the one of the video recordings is an at least one video clip within which there is an unusual absence of motion.

8. The video surveillance system as claimed in claim 1 wherein the storage device is further configured to store, during operation of the video surveillance system, unusual motions metadata corresponding to video recordings.

9. A video surveillance system comprising:
   a storage device storing, during operation of the video surveillance system, a plurality of video recordings; and
   a client device communicatively coupled to the storage device, the client device including at least one input device and a user interface responsive to the at least one input device, and the user interface being configured to:
   generate a plurality of displayed filter options operable to accept user input, each of the displayed filter options in respect of a different search criteria in relation to unusual motion detection, and first and second filter options of the displayed filter options corresponding to setting a rarity threshold and a minimum incident duration respectively; and
   cause the plurality of video recordings to be searched so that at least one portion of one of the video recordings is identified as an at least one unusual motion search result for the user input.

10. The video surveillance system as claimed in claim 9 wherein the client device is one of a personal computer, a laptop, a tablet, a Personal Data Assistant (PDA), a cell phone, and a smart phone.

11. The video surveillance system as claimed in claim 9 wherein the user interface is further configured to generate a displayed timeline within which at least one unusual motion search result appears as a rectangle.

12. The video surveillance system as claimed in claim 9 wherein a third of the displayed filter options corresponds to setting a classification type.

13. The video surveillance system as claimed in claim 9 further comprising a plurality of cameras communicatively coupled to the storage device, the cameras being configured to capture the video recordings.

14. The video surveillance system as claimed in claim 9 wherein the at least one portion of the one of the video recordings is an at least one video clip within which there is an unusual absence of motion.

15. The video surveillance system as claimed in claim 9 wherein the storage device is further configured to store, during operation of the video surveillance system, unusual motions metadata corresponding to video recordings.

* * * * *